(12) United States Patent
Watabe et al.

(10) Patent No.: US 7,219,414 B2
(45) Date of Patent: May 22, 2007

(54) METHOD OF MANUFACTURING MAGNETIC HEAD FOR PERPENDICULAR MAGNETIC RECORDING

(75) Inventors: Yuichi Watabe, Tokyo (JP); Susumu Aoki, Tokyo (JP); Yasuyuki Notsuke, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 277 days.

(21) Appl. No.: 11/041,266

(22) Filed: Jan. 25, 2005

(65) Prior Publication Data

US 2005/0229387 A1 Oct. 20, 2005

(30) Foreign Application Priority Data

Mar. 31, 2004 (JP) .............................. 2004-102122

(51) Int. Cl.
*G11B 5/187* (2006.01)
*C25D 5/102* (2006.01)

(52) U.S. Cl. ................... 29/603.13; 29/603.12; 29/603.14; 29/603.23; 205/119; 205/223; 360/122; 360/125

(58) Field of Classification Search ............ 29/603.13, 29/603.14, 603.15, 603.16, 603.17, 603.23, 29/603.07, 603.12; 205/118, 119, 221, 223; 427/282, 131; 360/122, 125
See application file for complete search history.

(56) References Cited

U.S. PATENT DOCUMENTS 5,427,675 A * 6/1995 Toyama et al. ......... 205/119 X 6,687,084 B2 2/2004 Takahashi et al.
6,710,973 B2 3/2004 Okada et al.
2003/0193744 A1 10/2003 Takahashi et al.

(Continued)

FOREIGN PATENT DOCUMENTS

JP 9-153204 * 6/1997

(Continued)

OTHER PUBLICATIONS

Sahami et al., "The Effect of Track Width and Topography on Composition Uniformity of Electroplated Permolloy in Thin Film Heads", IEEE Transactions on Magnetics, vol. 28, No. 5, Sep. 1992, pp. 2103-2105.*

*Primary Examiner*—A. Dexter Tugbang
(74) *Attorney, Agent, or Firm*—Oliff & Berridge, PLC

(57) ABSTRACT

A main pole layer of a magnetic head includes a first portion disposed at a distance from a medium facing surface, and a second portion that is smaller in thickness than the first portion and disposed between the first portion and the medium facing surface. The step of forming the main pole layer includes the steps of forming a plating layer such that one of ends of the plating layer closer to the medium facing surface is located at a position that coincides with the position of one of ends of the first portion closer to the medium facing surface; forming a first nonmagnetic layer to cover the plating layer; polishing the first nonmagnetic layer and the plating layer; forming a space by removing the plating layer; forming a magnetic layer, which will be the main pole layer, in the space and on the top surface of the first nonmagnetic layer; forming a second nonmagnetic layer to cover the magnetic layer; and polishing the second nonmagnetic layer and the magnetic layer.

7 Claims, 29 Drawing Sheets

U.S. PATENT DOCUMENTS

2004/0150910 A1 8/2004 Okada et al.

FOREIGN PATENT DOCUMENTS

| JP | A 2002-92821 | 3/2002 |
| JP | A 2002-133610 | 5/2002 |
| JP | A 2002-197615 | 7/2002 |
| JP | A 2003-006811 | 1/2003 |

* cited by examiner

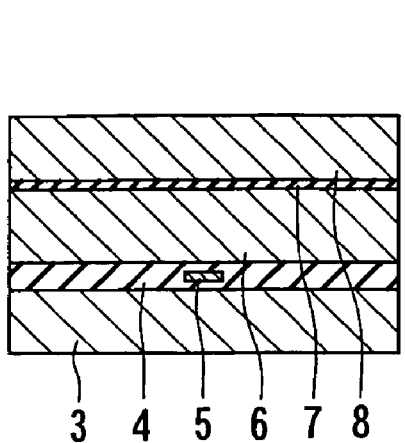
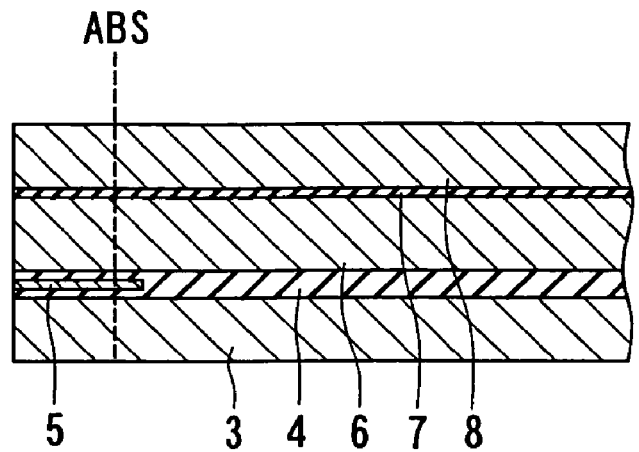
FIG. 4A  FIG. 4B
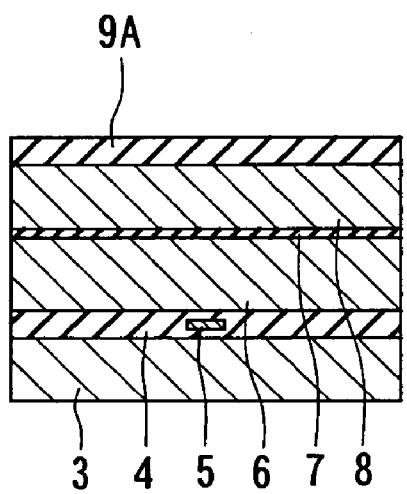
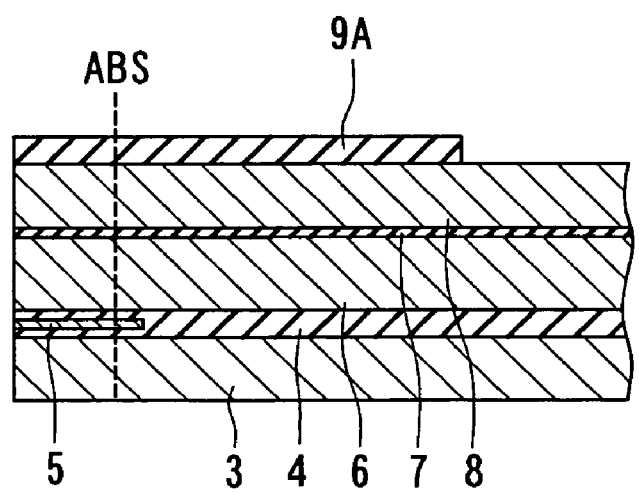
FIG. 5A  FIG. 5B

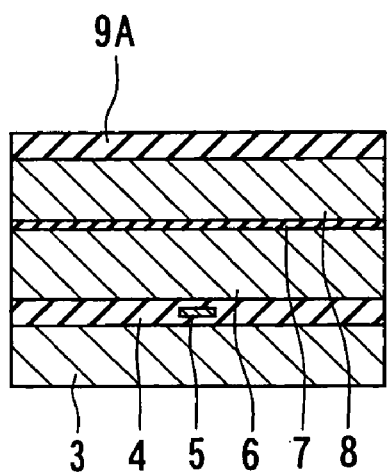
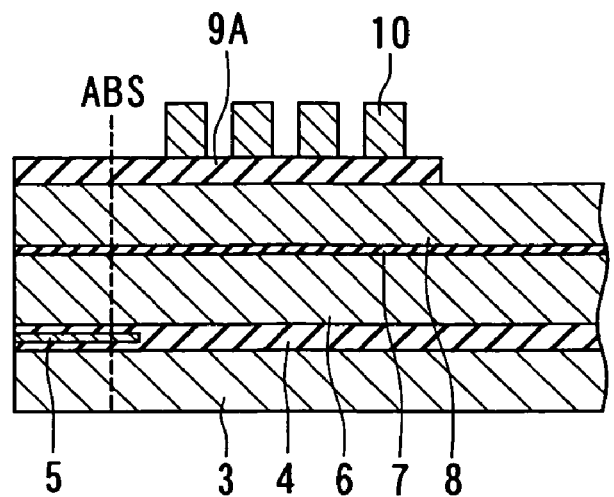
FIG. 6A　　　　　　　FIG. 6B
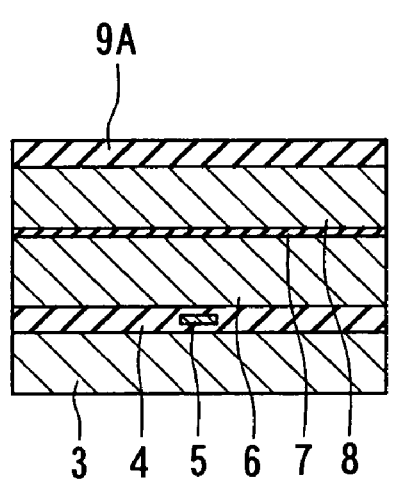
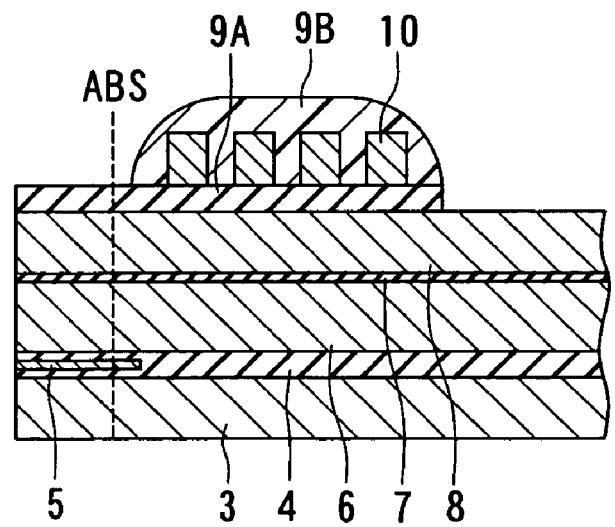
FIG. 7A　　　　　　　FIG. 7B

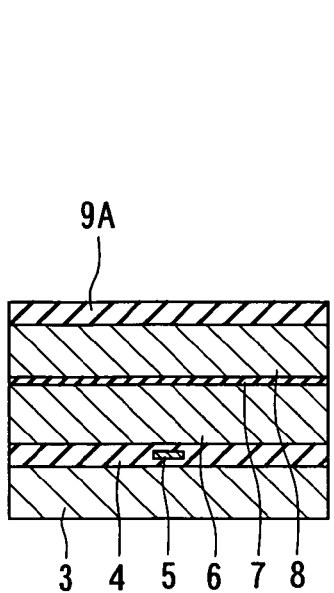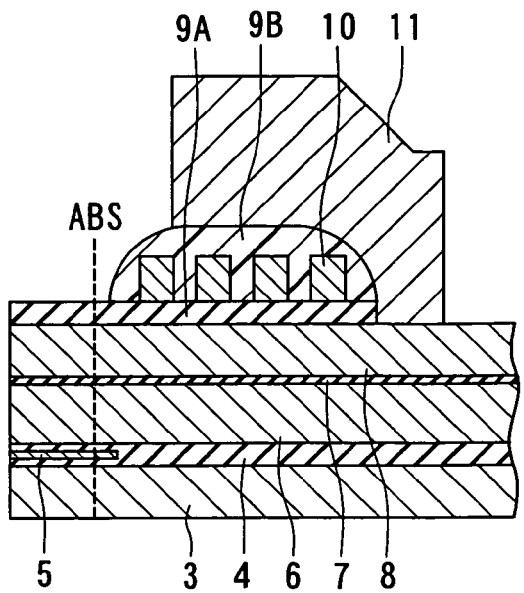
FIG. 8A  FIG. 8B
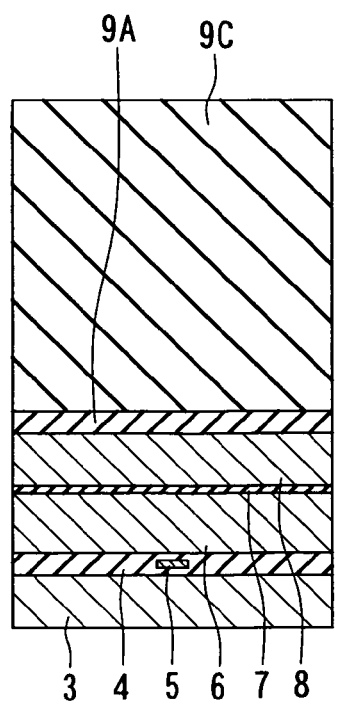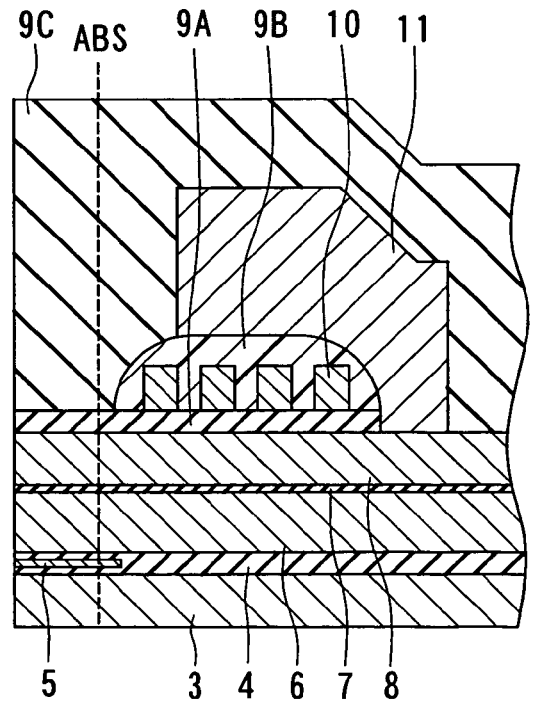
FIG. 9A  FIG. 9B

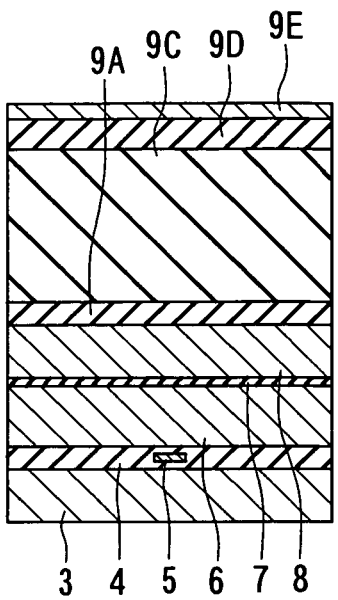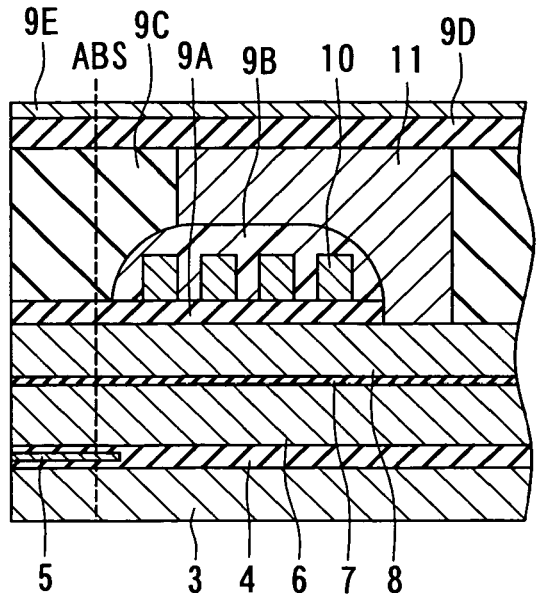
FIG. 12A    FIG. 12B
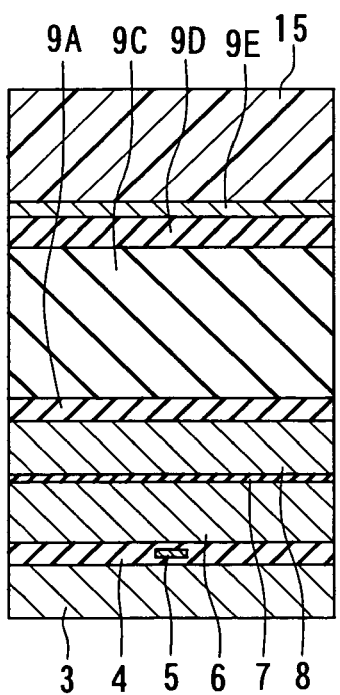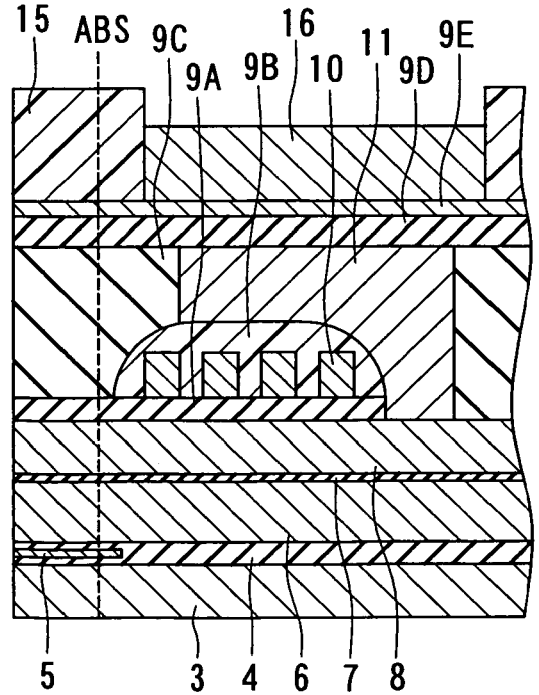
FIG. 13A    FIG. 13B

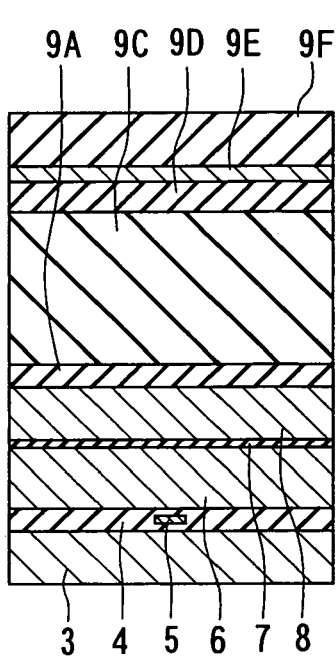
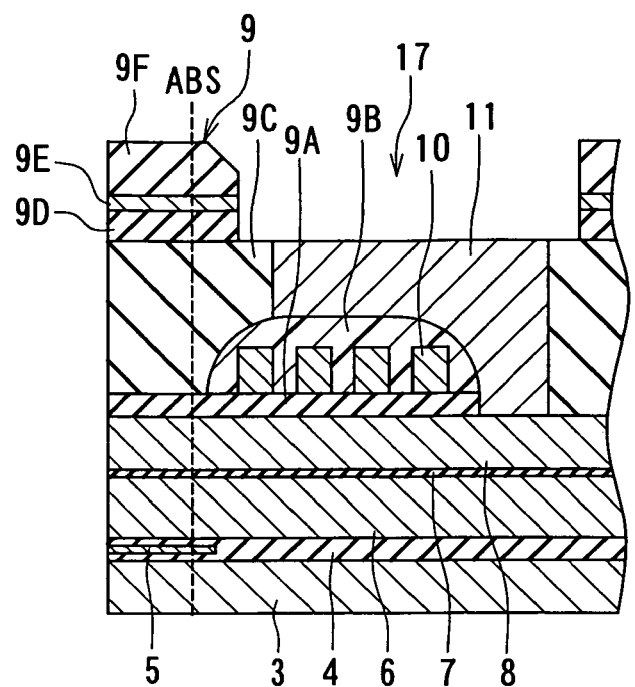
FIG. 17A   FIG. 17B
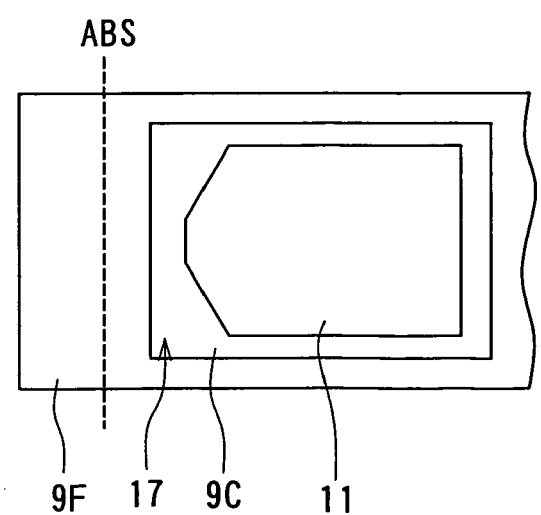
FIG. 17C

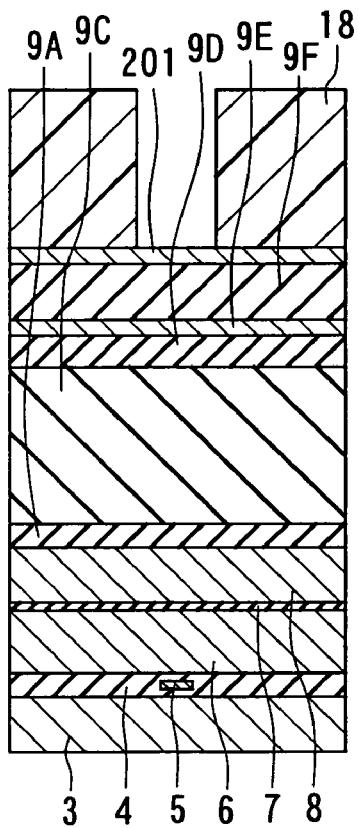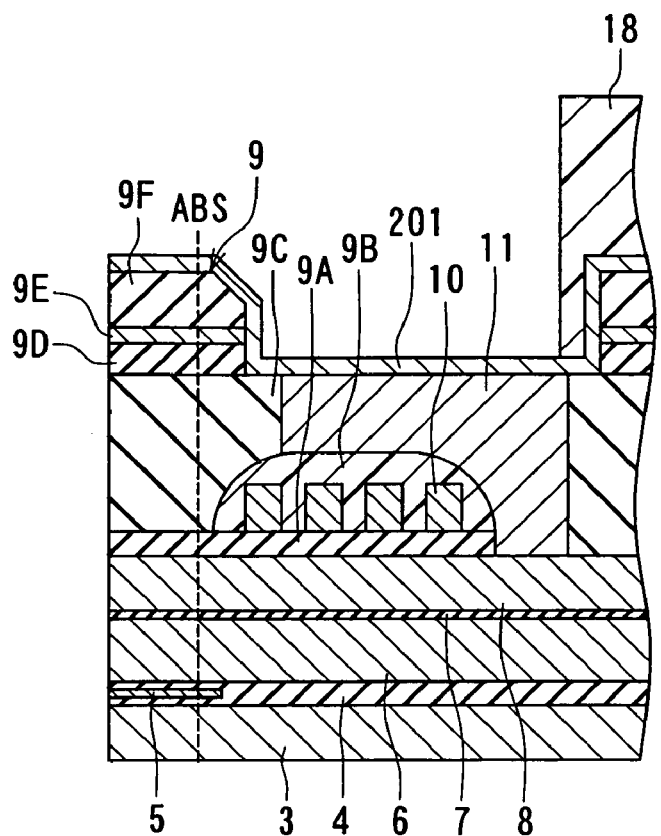
FIG. 18A  FIG. 18B
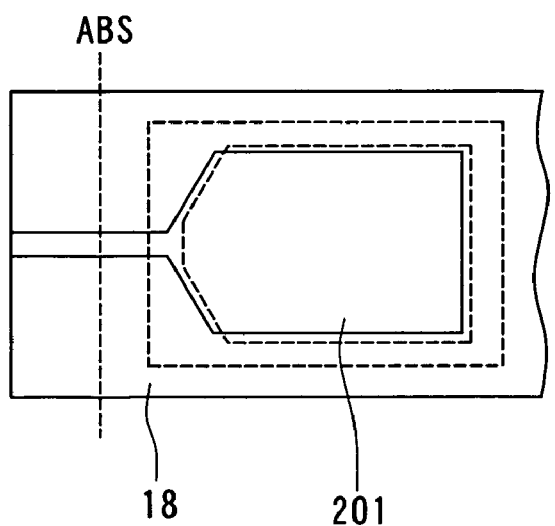
FIG. 18C

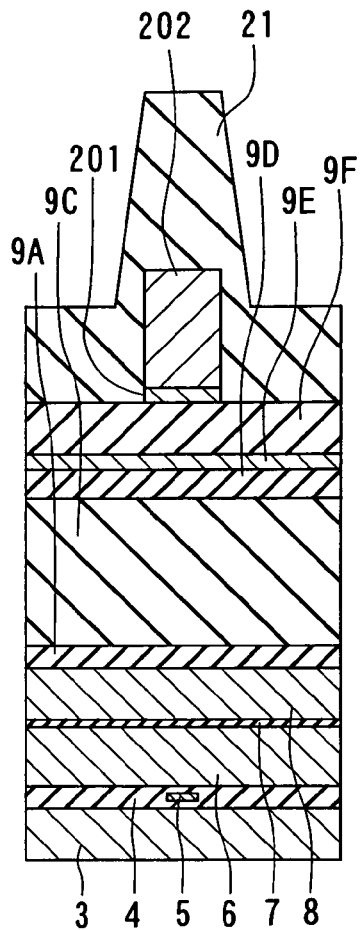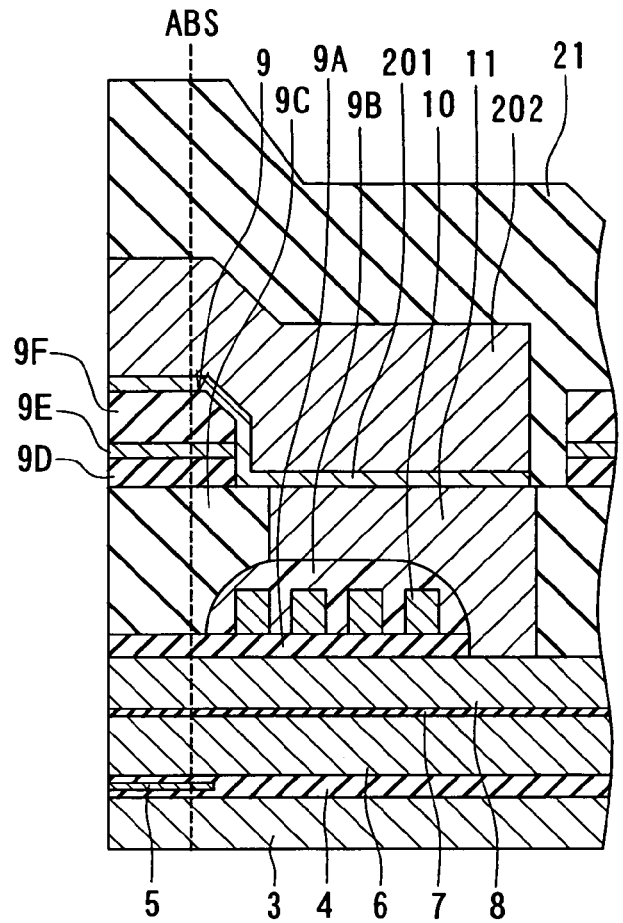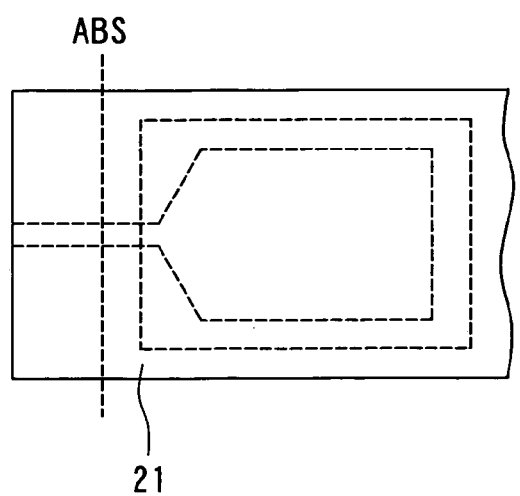
FIG. 21A
FIG. 21B
FIG. 21C

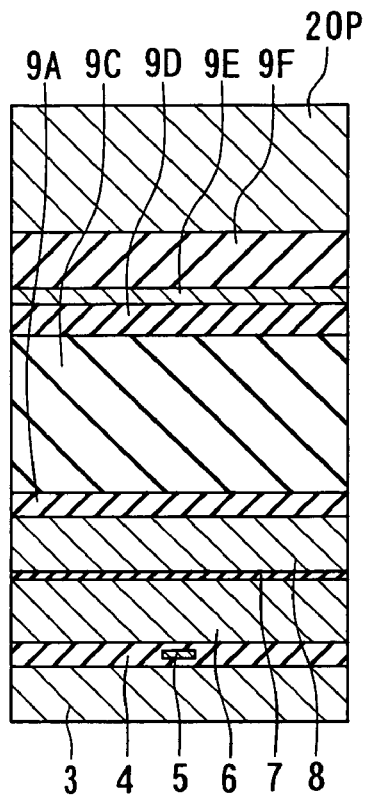
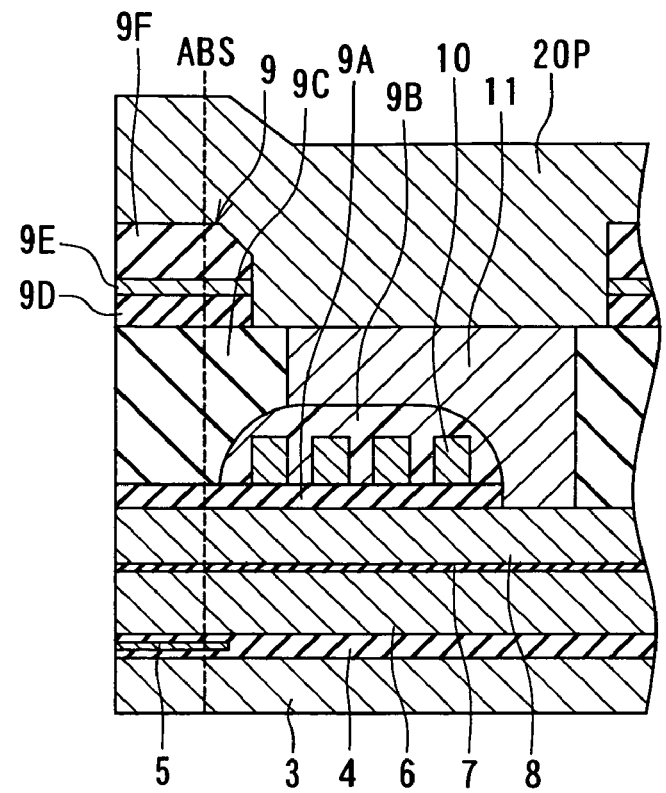
FIG. 31A          FIG. 31B
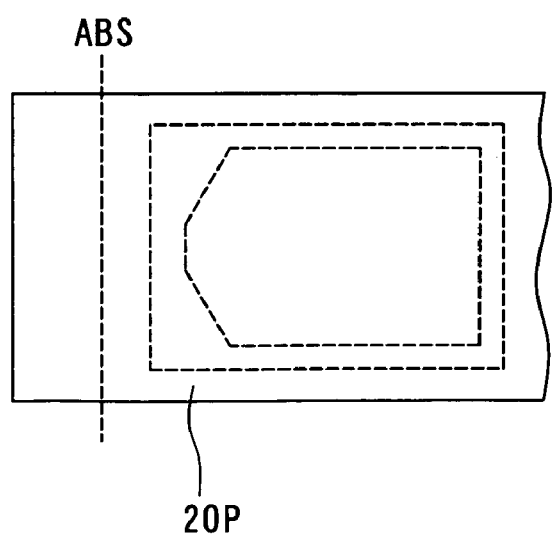
FIG. 31C

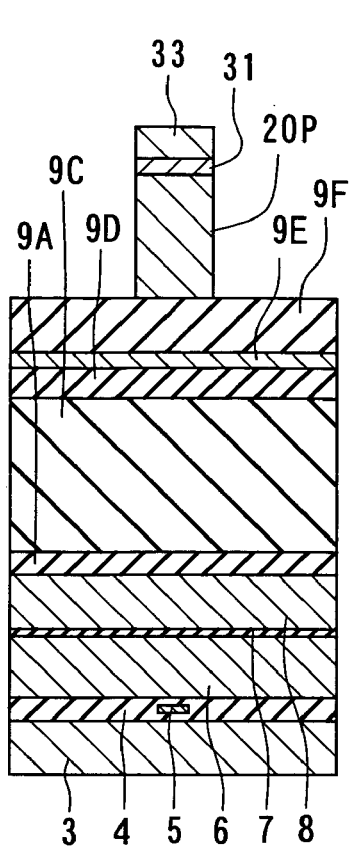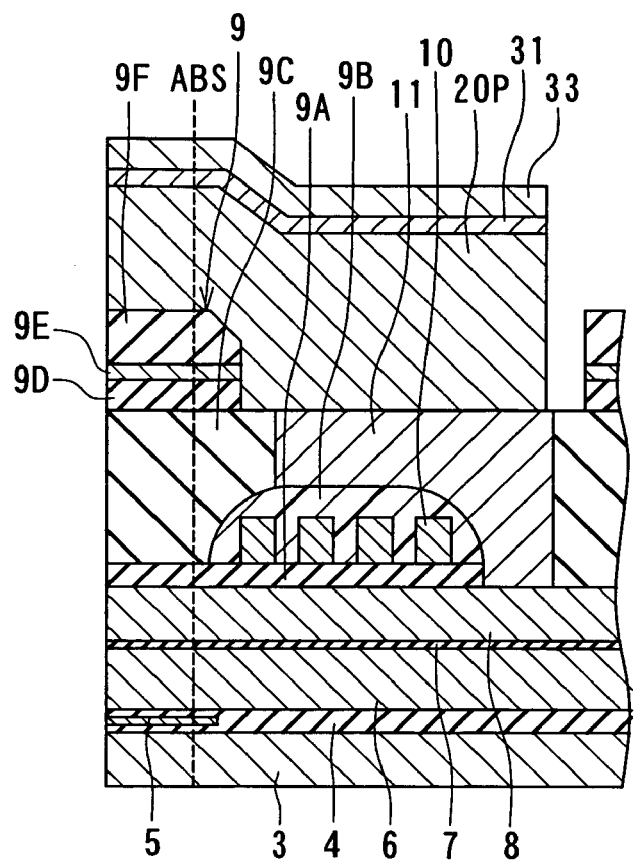
FIG. 34A      FIG. 34B
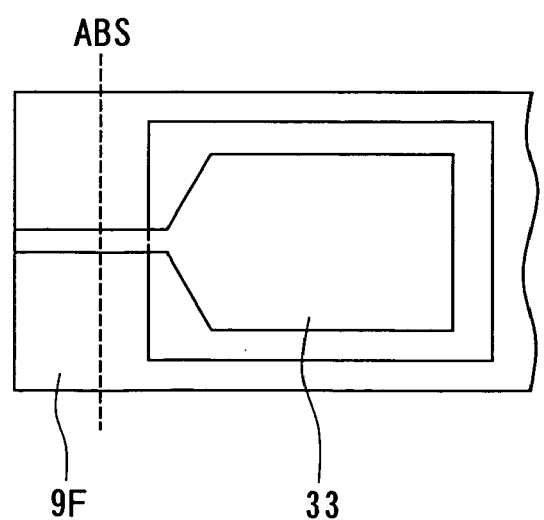
FIG. 34C

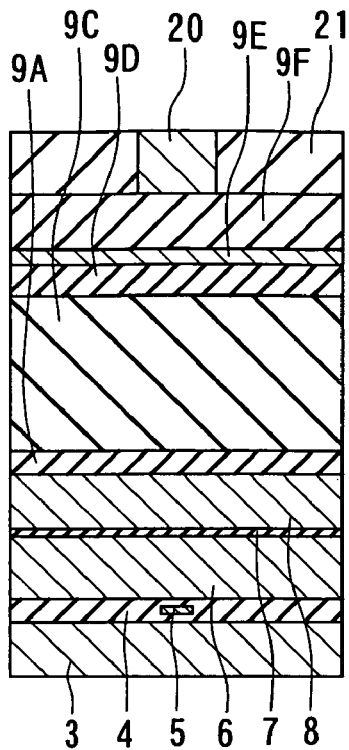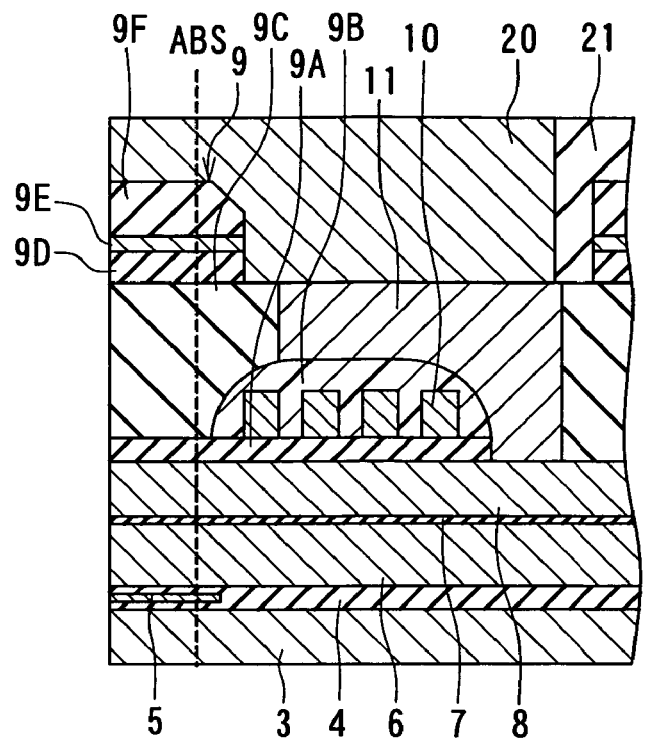
FIG. 36A  FIG. 36B
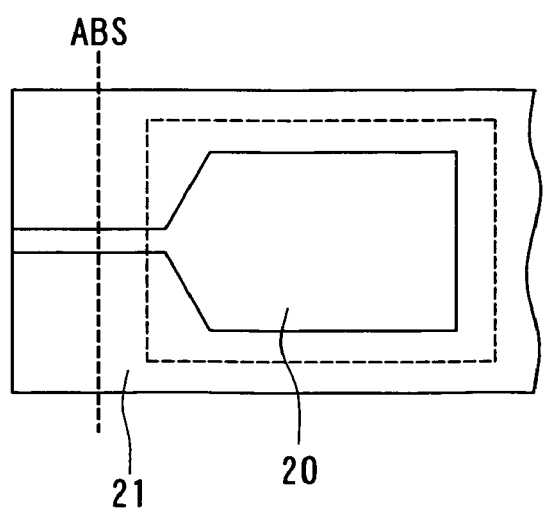
FIG. 36C

METHOD OF MANUFACTURING MAGNETIC HEAD FOR PERPENDICULAR MAGNETIC RECORDING

BACKGROUND OF THE INVENTION

1. Field of the Invention

The present invention relates to a method of manufacturing a magnetic head for perpendicular magnetic recording that is used for writing data on a recording medium by using a perpendicular magnetic recording system.

2. Description of the Related Art

Recording systems of magnetic read/write devices include a longitudinal magnetic recording system wherein signals are magnetized in a direction along the surface of the recording medium (the longitudinal direction) and a perpendicular magnetic recording system wherein signals are magnetized in a direction orthogonal to the surface of the recording medium. It is known that the perpendicular magnetic recording system is harder to be affected by thermal fluctuation of the recording medium and capable of implementing higher linear recording density, as compared with the longitudinal magnetic recording system.

One of known magnetic heads for the perpendicular magnetic recording system is a single-pole head that applies to a recording medium a magnetic field in a direction perpendicular thereto by using a single main pole. The single-pole head comprises the main pole and an auxiliary pole facing toward each other with a specific distance therebetween in a medium facing surface that faces toward the recording medium. The main pole and the auxiliary pole are coupled to each other at their respective portions located away from the medium facing surface. The single-pole head further comprises a gap layer disposed between the main pole and the auxiliary pole, and a coil at least a portion of which is disposed between the main pole and the auxiliary pole and insulated from the main pole and the auxiliary pole. The main pole includes a track width defining portion and a wide portion, for example. The track width defining portion has an end located in the medium facing surface and defines a track width. The wide portion is coupled to the other end of the track width defining portion and has a width greater than that of the track width defining portion. For example, the wide portion is equal in width to the track width defining portion at the boundary between the wide portion and the track width defining portion, then gradually increases in width with increasing distance from the medium facing surface, and then the width finally becomes constant.

What are required of magnetic heads for achieving higher recording density are a reduction in track width, that is, a reduction in width of the main pole taken in the medium facing surface, and an improvement in writing characteristics, in particular. However, a reduction in track width results in degradation in writing characteristics, such as an overwrite property that is a parameter indicating an overwriting capability. It is therefore required to achieve better writing characteristics as the track width is reduced.

A magnetic head used for a magnetic disk drive such as a hard disk drive is typically provided in a slider. The slider has the medium facing surface that faces toward the recording medium. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs according to the position of the magnetic head across the tracks. In a magnetic disk drive, the skew may cause such a phenomenon that, when data is written on a specific track, data stored on a track adjacent thereto is erased. This phenomenon is hereinafter called "adjacent track erasing". To achieve higher recording density, it is also required to suppress adjacent track erasing.

For magnetic heads for the perpendicular magnetic recording system, possible methods for improving the overwrite property include: a method in which the boundary between the track width defining portion and the wide portion of the main pole is made closer to the medium facing surface; a method in which the angle formed between a side surface of the track width defining portion and a medium-facing-surface-side end face of the wide portion is made closer to 90 degrees; and a method in which the main pole is increased in thickness. However, each of these methods is likely to cause adjacent track erasing.

To prevent adjacent track erasing when a skew occurs, Japanese Unexamined Patent Application Publication No. 2002-92821 discloses a technique in which an end face of the main pole located in the medium facing surface is made to have a shape of trapezoid in which the side located backward in the direction of travel of the recording medium (that is, the side located closer to the air inflow end of the slider) is shorter than the opposite side. However, this leads to degradation in overwrite property because the end face of the main pole located in the medium facing surface is reduced in area as compared with a case in which the end face is rectangle-shaped.

Accordingly, for preventing adjacent track erasing and also improving overwrite property, there have been proposed various techniques in which the thickness of the main pole is decreased with decreasing distance from the medium facing surface, as disclosed in, for example, Japanese Unexamined Patent Application Publication Nos. 2002-133610, 2002-197615 and 2003-6811 (hereinafter referred to as JP-A-2002-133610, JP-A-2002-197615 and JP-A-2003-6811, respectively).

JP-A-2002-133610 discloses a technique in which at least one of top and bottom surfaces of the main pole is slanted near the medium facing surface, so that a portion of the main pole near the medium facing surface is decreased in thickness with decreasing distance from the medium facing surface.

JP-A-2002-197615 discloses a technique in which a yoke layer whose front-end face is located away from the medium facing surface is connected to a main pole layer having a constant thickness, so that the layered structure made up of the main pole layer and the yoke layer decreases in thickness with decreasing distance from the medium facing surface.

JP-A-2003-6811 discloses a technique in which, in a magnetic layer constituting the main pole, one of two surfaces closer to the gap layer is formed to have a such shape that the surface of the magnetic layer gets closer to the auxiliary pole stepwise with increasing distance from the medium facing surface, so that the thickness of the main pole decreases with decreasing distance from the medium facing surface.

According to the technique disclosed in JP-A-2002-133610, in the course of manufacturing the magnetic head, if the point at which polishing is stopped is shifted when forming the medium facing surface by polishing, the thickness of the main pole taken in the medium facing surface is varied. Therefore, according to this technique, it is difficult to mass-produce uniform magnetic heads.

According to the technique disclosed in JP-A-2002-197615, the main pole layer is formed on the yoke layer, and these layers are individually patterned. As a result, misalignment of the yoke layer and the main pole layer is likely to occur. According to the technique, in particular, a portion of each of the yoke layer and the main pole layer near the medium facing surface has a width smaller than that of the other portion. Accordingly, misalignment of these portions having smaller widths could cause degradation in writing characteristics of the magnetic head. Furthermore, according the technique, the top surface of the yoke layer is flattened, and the main pole layer is formed thereon. Therefore, if the point at which polishing is stopped is shifted when flattening the top surface of the yoke layer by polishing, the position of one of ends of the yoke layer closer to the medium facing surface is varied. Consequently, according to this technique, it is difficult to mass-produce uniform magnetic heads.

According to the technique disclosed in JP-A-2003-6811, the shape of the top surface of a base layer for the magnetic layer constituting the main pole is determined by dry etching using a mask. Therefore, according to this technique, the point at which the thickness of the magnetic layer starts to decrease is determined by the position of the boundary between the bottom surface and the side surface of the recess formed by the dry etching. In this case, the position of the boundary between the bottom and side surfaces of the recess will vary by about ±0.15 µm. It is thus difficult to precisely control the point at which the thickness of the magnetic layer starts to decrease. Consequently, according to this technique, it is difficult to mass-produce uniform magnetic heads.

OBJECT AND SUMMARY OF THE INVENTION

It is an object of the invention to provide a method of manufacturing a magnetic head for perpendicular magnetic recording capable of manufacturing uniform magnetic heads achieving both an improved overwrite property and prevention of adjacent track erasing.

A magnetic head for perpendicular magnetic recording manufactured by a method of the invention comprises:

a medium facing surface that faces toward a recording medium;

a coil for generating a magnetic field corresponding to data to be written on the recording medium;

a main pole layer having an end located in the medium facing surface, allowing a magnetic flux corresponding to the magnetic field generated by the coil to pass therethrough, and generating a write magnetic field for writing the data on the recording medium through the use of a perpendicular magnetic recording system;

an auxiliary pole layer having an end located in the medium facing surface, and having a portion located away from the medium facing surface and coupled to the main pole layer; and a gap layer made of a nonmagnetic material and provided between the main pole layer and the auxiliary pole layer.

In the medium facing surface, the end of the main pole layer is disposed forward of the end of the auxiliary pole layer along a direction of travel of the recording medium with a specific distance therebetween. At least a portion of the coil is disposed between the main pole layer and the auxiliary pole layer and insulated from the main pole layer and the auxiliary pole layer. The main pole layer includes a first portion having a specific thickness, and a second portion having a thickness smaller than the thickness of the first portion. One of ends of the first portion closer to the medium facing surface is located at a distance from the medium facing surface. The second portion is disposed between the first portion and the medium facing surface. The main pole layer has a surface located farther from the gap layer. In this surface, at least a portion near the medium facing surface is substantially flat. Here, the phrase "substantially flat" is intended to include a case in which the surface has asperities of about 0.05 µm, because asperities of such an order may develop according to the accuracy level of the manufacturing process.

The method of manufacturing the magnetic head for perpendicular magnetic recording of the invention comprises the steps of:

forming the auxiliary pole layer;

forming the gap layer and the coil on the auxiliary pole layer; and forming the main pole layer on the gap layer.

The step of forming the main pole layer includes the steps of:

forming a plating layer by plating in a region that includes a region in which the first portion is to be disposed, such that one of ends of the plating layer closer to the medium facing surface is located at a position that coincides with the position of the one of the ends of the first portion closer to the medium facing surface;

forming a first nonmagnetic layer to cover the plating layer;

patterning the first nonmagnetic layer into such a shape that the first nonmagnetic layer is adjacent to the plating layer by polishing the first nonmagnetic layer and the plating layer until the plating layer is exposed;

forming a space by removing the plating layer by etching, the space being adjacent to the first nonmagnetic layer and having a shape corresponding to the shape of the plating layer;

forming a magnetic layer in the space and on a top surface of the first nonmagnetic layer, the magnetic layer having a plane geometry corresponding to that of the main pole layer;

forming a second nonmagnetic layer to cover the magnetic layer; and polishing the second nonmagnetic layer and the magnetic layer until the magnetic layer is exposed, so that the magnetic layer becomes the main pole layer.

According to the invention, the position of the boundary between the first portion and the second portion having different thicknesses is determined by the position of an end of the plating layer formed by plating, the end being closer to the medium facing surface. The position of the end of the plating layer closer to the medium facing surface is controllable with higher precision, compared with the boundary between the bottom and side surfaces of a recess formed by dry etching. According to the invention, it is thus possible to precisely determine the position of the boundary between the first and second portions.

In the invention, the step of forming the main pole layer may further include the step of removing a portion of an edge formed by a wall of the first nonmagnetic layer facing toward the space and the top surface of the first nonmagnetic layer, the portion of the edge being located near the position of the boundary between the first portion and the second portion. Here, the step of removing the portion of the edge is performed by dry etching and interposed between the step of forming the space and the step of forming the magnetic layer. In this case, in a region from the boundary between the first and second portions to a specific point closer to the medium facing surface than the boundary, the thickness of the second portion gradually decreases with decreasing distance from the medium facing surface.

In the invention, the magnetic layer may be formed by plating or sputtering.

In the invention, the end of the main pole layer located in the medium facing surface may be made to have a shape of trapezoid in which a side closer to the gap layer is shorter than the opposite side.

In the invention, a width of the main pole layer taken in a region closer to the medium facing surface than a specific width-changing point that is located at a distance from the medium facing surface may be equal to a width of the main pole layer taken in the medium facing surface, while a width of the main pole layer taken in a region farther from the medium facing surface than the width-changing point may be greater than the width of the main pole layer taken in the medium facing surface. In this case, a thickness of the main pole layer taken in a region closer to the medium facing surface than a thickness-changing point that is located between the width-changing point and the medium facing surface may be equal to a thickness of the main pole layer taken in the medium facing surface, while a thickness of the main pole layer taken in a region farther from the medium facing surface than the thickness-changing point may be greater than the thickness of the main pole layer taken in the medium facing surface.

According to the invention, the main pole layer is formed to include: the first portion having a specific thickness, one of the ends of the first portion closer to the medium facing surface being located at a distance from the medium facing surface; and the second portion having a thickness smaller than the thickness of the first portion and disposed between the first portion and the medium facing surface. At least a portion of the surface of the main pole layer farther from the gap layer, the portion being near the medium facing surface, is substantially flat. According to the invention, the position of the boundary between the first portion and the second portion having different thicknesses is determined by the position of one of the ends of the plating layer formed by plating, the end being closer to the medium facing surface. This makes it possible to precisely determine the position of the boundary between the first and second portions. Consequently, according to the invention, it is possible to manufacture magnetic heads for perpendicular magnetic recording that are uniform and capable of improving the overwrite property while preventing adjacent track erasing.

In the invention, the step of forming the main pole layer may further include the step of removing a portion of the edge formed by the wall of the first nonmagnetic layer facing toward the space and the top surface of the first nonmagnetic layer, the portion of the edge being located near the position of the boundary between the first portion and the second portion. Here, the step of removing the portion of the edge is performed by dry etching and interposed between the step of forming the space and the step of forming the magnetic layer. In this case, in the region from the boundary between the first and second portions to a specific point closer to the medium facing surface than the boundary, the thickness of the second portion gradually decreases with decreasing distance from the medium facing surface. As a result, the flow of a magnetic flux passing through the main pole layer becomes smooth, and the overwrite property is thereby improved further.

According to the invention, if the end of the main pole layer located in the medium facing surface is made to have a shape of trapezoid in which the side closer to the gap layer is shorter than the opposite side, it is possible to prevent adjacent track erasing with higher reliability.

In the invention, a width of the main pole layer taken in a region closer to the medium facing surface than the specific width-changing point located at a distance from the medium facing surface may be equal to a width of the main pole layer taken in the medium facing surface, while a width of the main pole layer taken in a region farther from the medium facing surface than the width-changing point may be greater than the width of the main pole layer taken in the medium facing surface. In this case, the main pole layer is capable of efficiently introducing a magnetic flux of greater magnitude to the end of the main pole layer located in the medium facing surface, and the overwrite property is thereby improved further.

In the invention, a thickness of the main pole layer taken in a region closer to the medium facing surface than the thickness-changing point located between the width-changing point and the medium facing surface may be equal to a thickness of the main pole layer taken in the medium facing surface, while a thickness of the main pole layer taken in a region farther from the medium facing surface than the thickness-changing point may be greater than the thickness of the main pole layer taken in the medium facing surface. In this case, it is possible to improve the overwrite property while preventing adjacent track erasing with higher reliability.

Other and further objects, features and advantages of the invention will appear more fully from the following description.

BRIEF DESCRIPTION OF THE DRAWINGS

FIG. 4A and FIG. 4B are views for illustrating a step of a method of manufacturing the magnetic head of the first embodiment of the invention.

FIG. 5A and FIG. 5B are views for illustrating a step that follows the step shown in FIG. 4A and FIG. 4B.

FIG. 6A and FIG. 6B are views for illustrating a step that follows the step shown in FIG. 5A and FIG. 5B.

FIG. 7A and FIG. 7B are views for illustrating a step that follows the step shown in FIG. 6A and FIG. 6B.

FIG. 8A and FIG. 8B are views for illustrating a step that follows the step shown in FIG. 7A and FIG. 7B.

FIG. 9A and FIG. 9B are views for illustrating a step that follows the step shown in FIG. 8A and FIG. 8B.

FIG. 12A and FIG. 12B are views for illustrating a step that follows the step shown in FIG. 12A and FIG. 12B.

FIG. 13A and FIG. 13B are views for illustrating a step that follows the step shown in FIG. 12A and FIG. 12B.

FIG. 17A to FIG. 17C are views for illustrating a step that follows the step shown in FIG. 16A to FIG. 16C.

FIG. 18A to FIG. 18C are views for illustrating a step that follows the step shown in FIG. 17A to FIG. 17C.

FIG. 21A to FIG. 21C are views for illustrating a step that follows the step shown in FIG. 20A to FIG. 20C.

FIG. 31A to FIG. 31C are views for illustrating a step of a method of manufacturing a magnetic head for perpendicular magnetic recording of a second embodiment of the invention.

FIG. 34A to FIG. 34C are views for illustrating a step that follows the step shown in FIG. 33A to FIG. 33C.

FIG. 36A to FIG. 36C are views for illustrating a step that follows the step shown in FIG. 35A to FIG. 35C.

DETAILED DESCRIPTION OF THE PREFERRED EMBODIMENTS

[First Embodiment]

Figure 1:
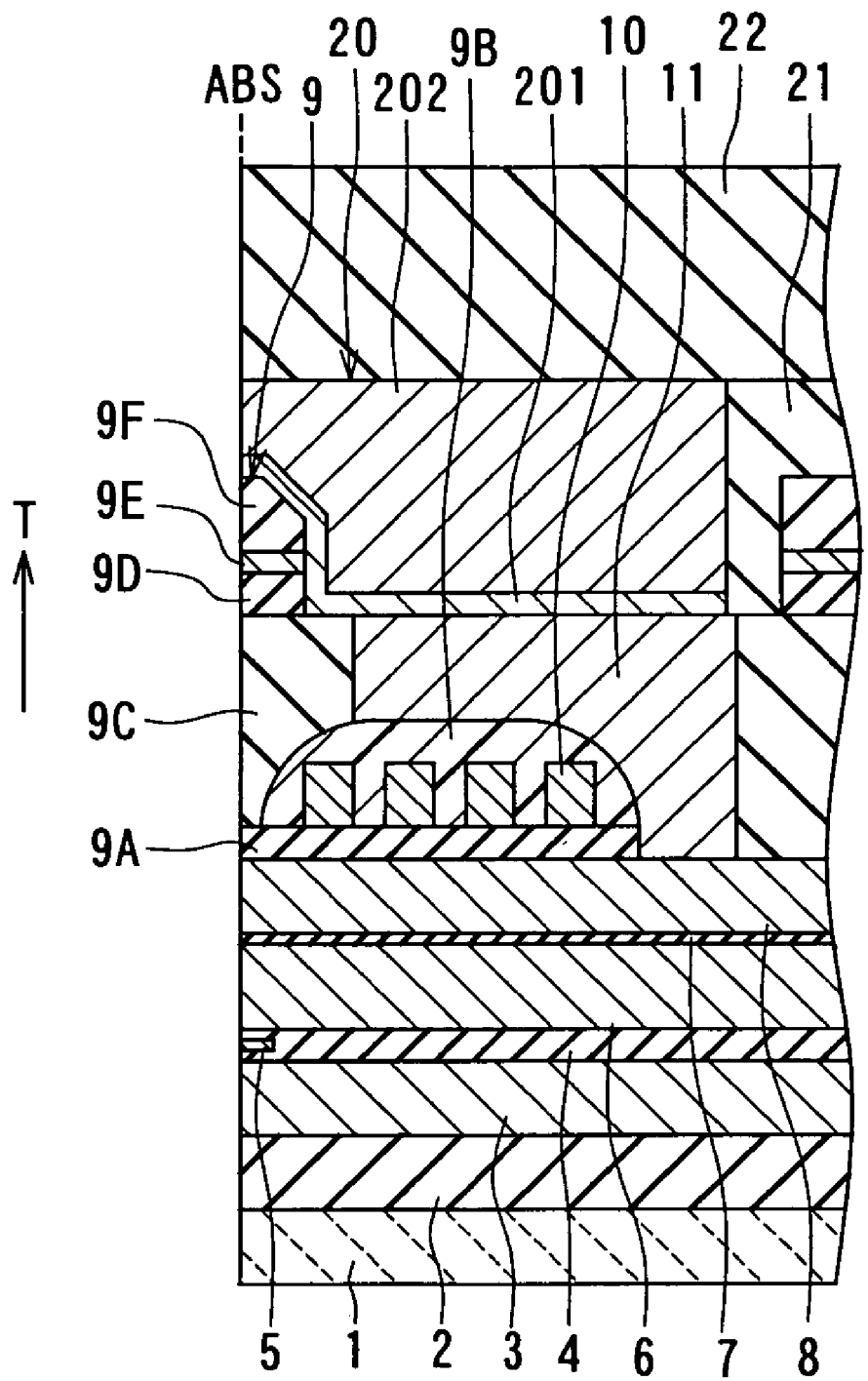
FIG. 1 is a cross-sectional view for illustrating the configuration of a magnetic head for perpendicular magnetic recording of a first embodiment of the invention.
Figure 2:
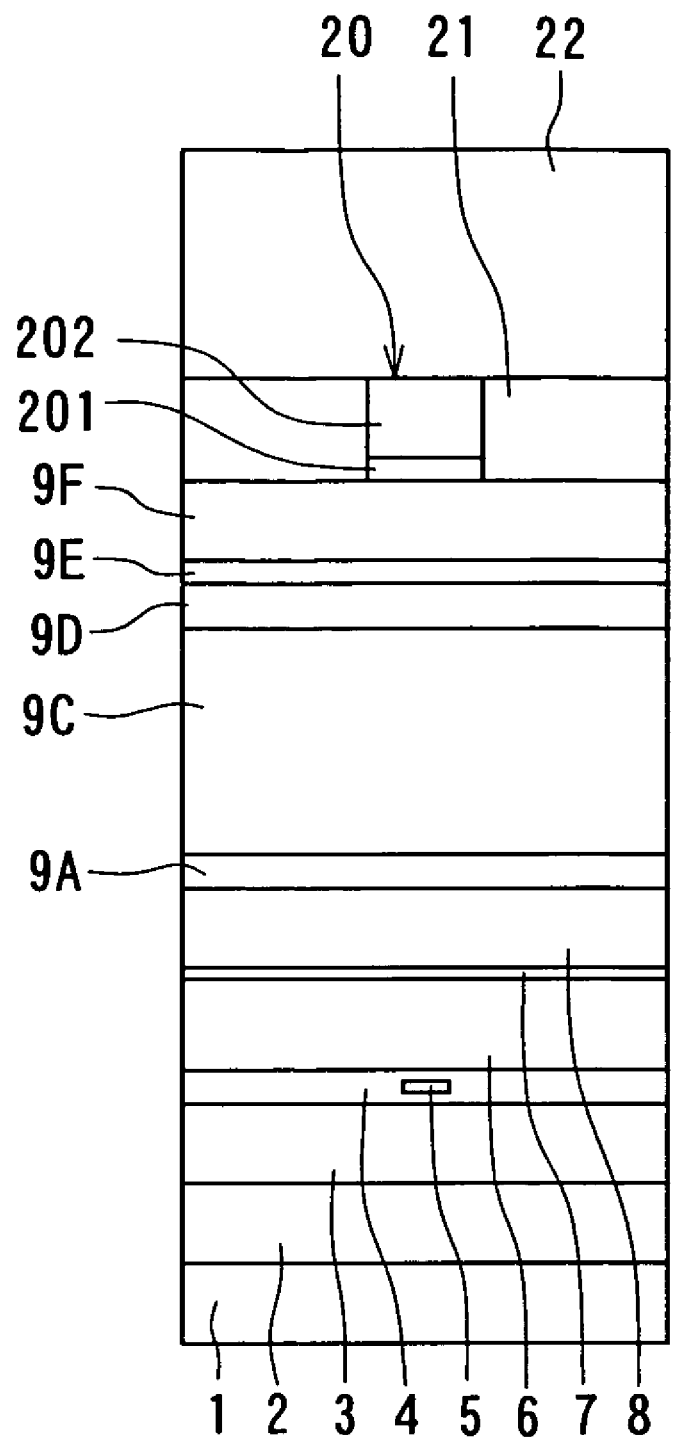
FIG. 2 is a front view of the medium facing surface of the magnetic head of FIG. 1.

Preferred embodiments of the invention will now be described in detail with reference to the accompanying drawings. Reference is now made to FIG. 1 and FIG. 2 to describe the configuration of a magnetic head for perpendicular magnetic recording of a first embodiment of the invention. FIG. 1 is a cross-sectional view for illustrating the configuration of the magnetic head of the embodiment. FIG. 1 illustrates a cross section orthogonal to the medium facing surface and a surface of a substrate. The arrow indicated with T in FIG. 1 shows the direction of travel of a recording medium. FIG. 2 is a front view of the medium facing surface of the magnetic head of the embodiment.

As shown in FIG. 1 and FIG. 2, the magnetic head for perpendicular magnetic recording (hereinafter simply called the magnetic head) of the first embodiment comprises: a substrate 1 made of a ceramic material such as aluminum oxide and titanium carbide ($Al_2O_3$—TiC); an insulating layer 2 made of an insulating material such as alumina ($Al_2O_3$) and formed on the substrate 1; a bottom shield layer 3 made of a magnetic material and formed on the insulating layer 2; a magnetoresistive (MR) element 5 as a read element formed over the bottom shield layer 3 via an insulating layer 4; and a top shield layer 6 made of a magnetic material and formed over the MR element 5 via the insulating layer 4. The magnetic material used to make the bottom shield layer 3 and the top shield layer 6 may be NiFe, for example. Each of the bottom shield layer 3 and the top shield layer 6 has a thickness of 1 to 2 μm, for example.

The MR element 5 has an end that is located in the medium facing surface (air bearing surface) ABS that faces toward the recording medium. The MR element 5 may be an element made of a magneto-sensitive film that exhibits a magnetoresistive effect, such as an anisotropic magnetoresistive (AMR) element, a giant magnetoresistive (GMR) element, and a tunnel magnetoresistive (TMR) element.

The magnetic head further comprises: a nonmagnetic layer 7 made of a nonmagnetic material such as alumina and formed on the top shield layer 6; an auxiliary pole layer 8 made of a magnetic material and formed on the nonmagnetic layer 7; an insulating layer 9A formed on a portion of the auxiliary pole layer 8 in which a thin-film coil 10 is to be formed; the thin-film coil 10 formed on the insulating layer 9A; and an insulating layer 9B that at least fills a space between adjacent ones of the turns of the thin-film coil 10 and that is not exposed in the medium facing surface ABS. The thin-film coil 10 is flat-whorl-shaped. The insulating layer 9B is formed to cover the thin-film coil 10 entirely.

The magnetic material used to make the auxiliary pole layer 8 may be NiFe, for example. The auxiliary pole layer 8 has a thickness of 1 to 5 μm, for example. The insulating layer 9A is made of a nonconductive and nonmagnetic material such as alumina, and has a thickness of 0.1 to 1 μm, for example. The thin-film coil 10 is made of a conductive material such as copper, and has turns whose thickness is 0.3 to 2 μm, for example. The number of turns of the thin-film coil 10 and the pitch thereof may be arbitrarily chosen. The insulating layer 9B is made of a nonconductive and nonmagnetic material that exhibits fluidity when formed. To be specific, the insulating layer 9B may be made of an organic nonconductive and nonmagnetic material such as a photoresist (photosensitive resin), or a spin-on-glass (SOG) film made of coating glass.

The magnetic head further comprises an insulating layer 9C that is exposed in the medium facing surface ABS and formed on the insulating layers 9A and 9B to extend from a portion of the insulating layer 9B close to the medium facing surface ABS to the medium facing surface ABS. The insulating layer 9C is made of a nonconductive and nonmagnetic material that exhibits resistance to corrosion, stiffness and an insulating property better than the insulating layer 9B. Such a material may be an inorganic nonconductive and nonmagnetic material such as alumina or silicon dioxide ($SiO_2$).

The magnetic head further comprises a yoke layer 11 made of a magnetic material. The yoke layer 11 magnetically couples the auxiliary pole layer 8 to a main pole layer 20 that will be described later. The yoke layer 11 is formed on the auxiliary pole layer 8 and the insulating layer 9B and extends from the position of the center of the thin-film coil 10 toward the medium facing surface ABS, reaching the position of an end face of the insulating layer 9C farther from the medium facing surface ABS. One of ends of the yoke layer 11 closer to the medium facing surface ABS is located at a distance of 1.5 µm or greater, for example, from the medium facing surface ABS. The thickness of the yoke layer 11 taken at the end thereof closer to the medium facing surface ABS is 1 µm, for example. The magnetic material used to make the yoke layer 11 may be an alloy containing iron, for example.

The magnetic head further comprises a nonmagnetic layer 9D, a nonmagnetic electrode film 9E, and a nonmagnetic layer 9F that are formed in this order to make a layered structure on the insulating layer 9C. The layered structure made up of the nonmagnetic layers 9D, 9F and the electrode film 9E is shaped like a frame having a space inside. The space inside the layered structure is located in a region that includes a region in which the top surface of the yoke layer 11 is located. The nonmagnetic layers 9D and 9F are made of a nonconductive and nonmagnetic material such as alumina. The nonmagnetic electrode film 9E is made of a nonmagnetic and conductive material such as Au or an AuCu alloy. The insulating layers 9A to 9C, the nonmagnetic layer 9D, the nonmagnetic electrode film 9E and the nonmagnetic layer 9F make up a gap layer 9 that is provided between the auxiliary pole layer 8 and the main pole layer 20. The thickness of the gap layer 9 taken in the medium facing surface ABS is 2 to 5 µm, for example.

The magnetic head further comprises: the main pole layer 20 made of a magnetic material and formed on the gap layer 9 and the yoke layer 11; a nonmagnetic layer 21 made of a nonconductive and nonmagnetic material such as alumina and disposed around the main pole layer 20; and a protection layer 22 made of a nonconductive and nonmagnetic material such as alumina and formed to cover the main pole layer 20.

The main pole layer 20 of the first embodiment comprises: a magnetic electrode film 201 formed on the gap layer 9 and the yoke layer 11; and a plating layer 202 formed on the magnetic electrode film 201. The magnetic electrode film 201 is made of a magnetic and conductive material. The plating layer 202 is made of a magnetic material. The plating layer 202 preferably has a saturated flux density greater than that of the yoke layer 11. The magnetic material used to make the plating layer 202 may be FeCo, for example. Detailed descriptions will be given later as to the shape of the main pole layer 20.

As described so far, the magnetic head of the embodiment comprises the medium facing surface ABS that faces toward a recording medium, a read head, and a write head. The read head is disposed backward along the direction T of travel of the recording medium (that is, disposed closer to the air inflow end of the slider). The write head is disposed forward in the direction T of travel of the recording medium (that is, disposed closer to the air outflow end of the slider).

The read head comprises the MR element 5 as the read element, and the bottom shield layer 3 and the top shield layer 6 for shielding the MR element 5. Portions of the bottom shield layer 3 and the top shield layer 6 that are located on a side of the medium facing surface ABS are opposed to each other with the MR element 5 placed between these portions. The read head further comprises the insulating layer 4 disposed between the MR element 5 and the bottom shield layer 3, and between the MR element 5 and the top shield layer 6.

The write head comprises the thin-film coil 10, the main pole layer 20, the auxiliary pole layer 8, the gap layer 9, and the yoke layer 11. The thin-film coil 10 generates a magnetic field corresponding to data to be written on the recording medium. The main pole layer 20 has an end located in the medium facing surface ABS, allows a magnetic flux corresponding to the magnetic field generated by the thin-film coil 10 to pass therethrough, and generates a write magnetic field for writing the data on the recording medium through the use of the perpendicular magnetic recording system. The auxiliary pole layer 8 has an end located in the medium facing surface ABS. In the medium facing surface ABS, the end of the main pole layer 20 is disposed forward of the end of the auxiliary pole layer 8 along the direction T of travel of the recording medium (that is, disposed closer to the air outflow end of the slider) with a specific distance therebetween. The gap layer 9 is made of a nonmagnetic material and provided between the main pole layer 20 and the auxiliary pole layer 8. The yoke layer 11 has the end closer to the medium facing surface ABS that is located at a distance from the medium facing surface ABS. The yoke layer 11 magnetically couples the auxiliary pole layer 8 and the main pole layer 20 to each other at their portions located away from the medium facing surface ABS. At least a portion of the thin-film coil 10 is disposed between the main pole layer 20 and the auxiliary pole layer 8, and insulated from the main pole layer 20, the auxiliary pole layer 8 and the yoke layer 11.

Figure 23:
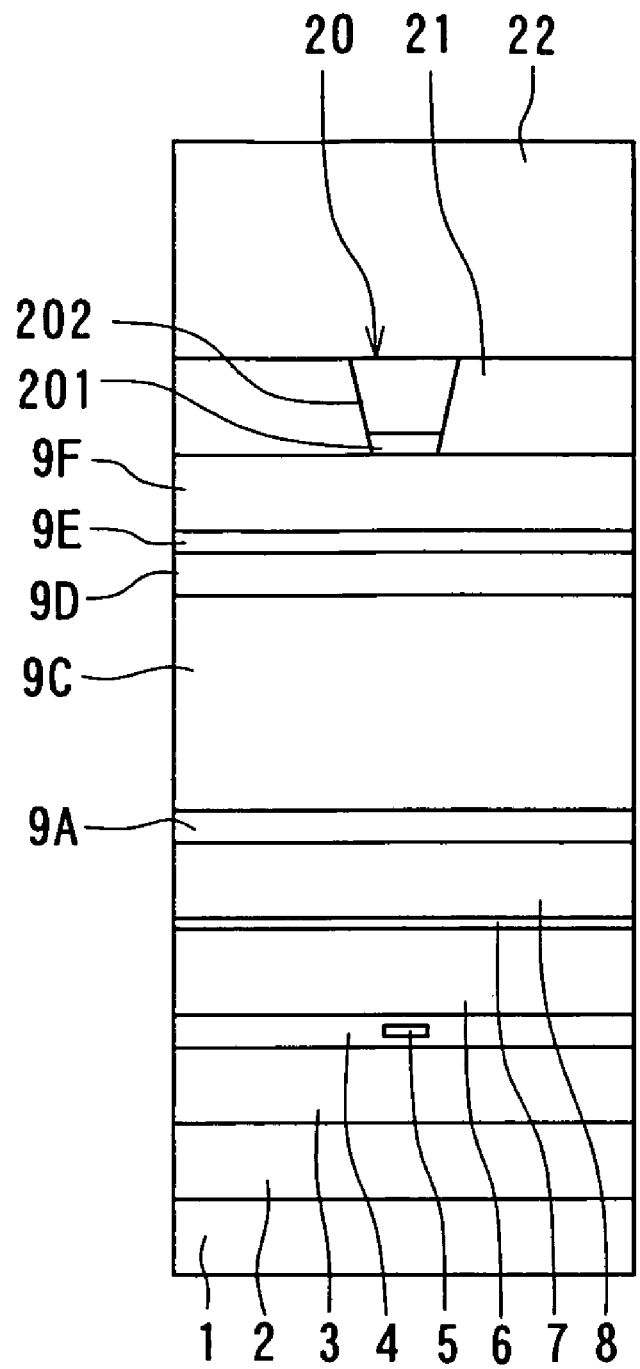
FIG. 23 is a front view of the medium facing surface of a modification example of the magnetic head of the first embodiment.

In FIG. 2, the end of the main pole layer 20 located in the medium facing surface ABS is rectangle-shaped. However, as shown in FIG. 23, the end may have a shape of trapezoid in which the side closer to the gap layer 9 is shorter than the opposite side.

Figure 3:
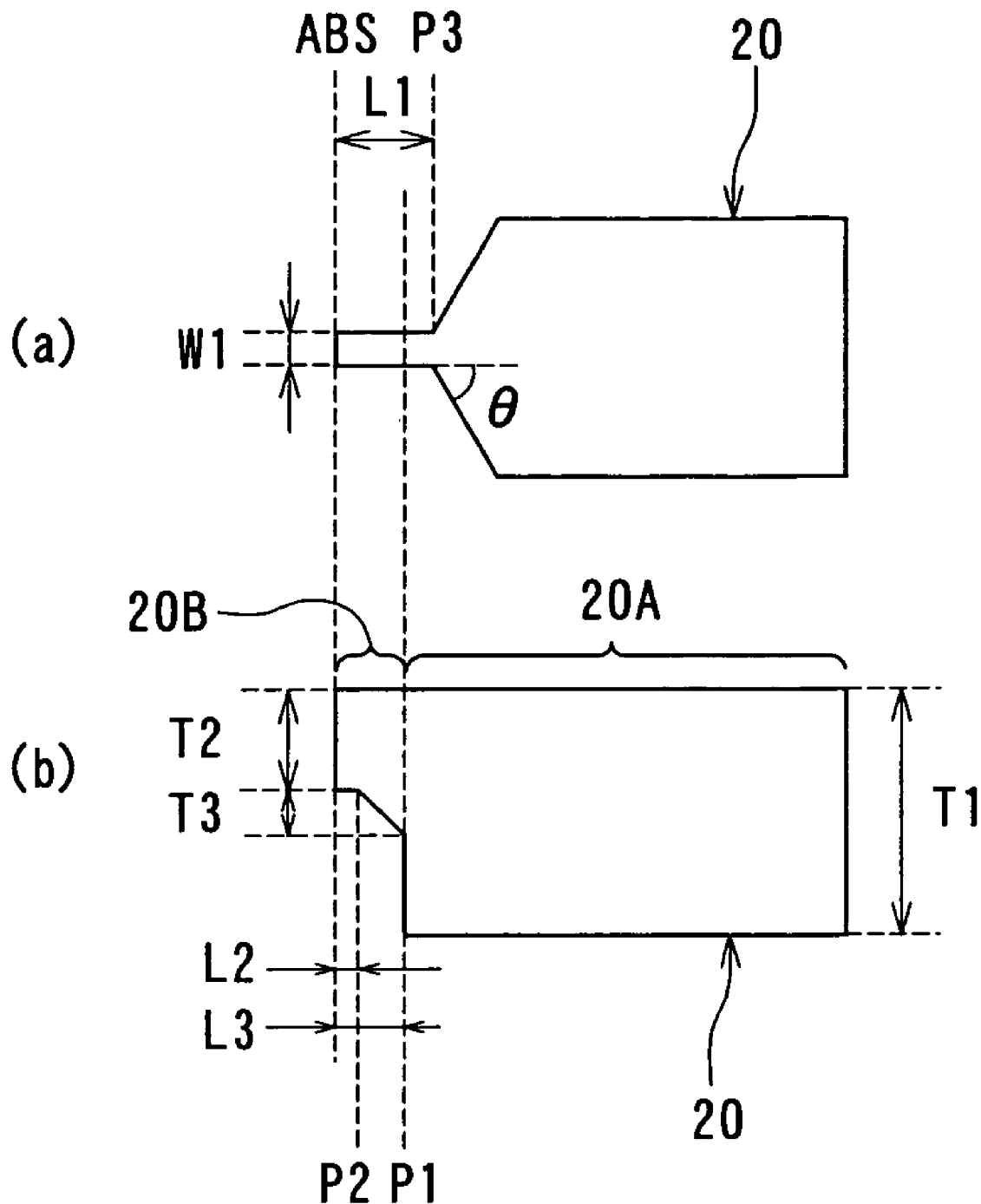
FIG. 3 illustrates the shape of the main pole layer of the magnetic head of FIG. 1.

Reference is now made to FIG. 3 to describe the shape of the main pole layer 20 in detail. FIG. 3 illustrates the shape of the main pole layer of the magnetic head of the first embodiment. FIG. 3(a) is a top view of the main pole layer 20. FIG. 3(b) is a side view of the main pole layer 20.

The thickness of the main pole layer 20 decreases with decreasing distance from the medium facing surface ABS. The main pole layer 20 includes a first portion 20A having a specific thickness T1, and a second portion 20B having a thickness smaller than the thickness T1 of the first portion 20A. One of ends of the first portion 20A closer to the medium facing surface ABS is located at a distance from the medium facing surface ABS. The second portion 20B is located between the first portion 20A and the medium facing surface ABS.

The main pole layer 20 has a surface farther from the gap layer 9 (that is, the top surface), at least a portion of the surface near the medium facing surface ABS being substantially flat. FIG. 1 and FIG. 3(b) show an example in which the entire surface of the main pole layer 20 farther from the gap layer 9 is substantially flat.

In FIG. 3, P3 indicates a specific width-changing point that is located at a distance from the medium facing surface ABS. As shown in FIG. 3(a), a width of the main pole layer 20 taken in a region closer to the medium facing surface ABS than the width-changing point P3 is equal to a width W1 of the main pole layer 20 taken in the medium facing surface ABS, while a width of the main pole layer 20 taken in a region farther from the medium facing surface ABS than the width-changing point P3 is greater than the width W1 of the main pole layer 20 taken in the medium facing surface ABS. The width W1 of the main pole layer 20 taken in the medium facing surface ABS defines a track width. The width W1 is 0.05 to 0.25 μm, for example.

In FIG. 3, P2 indicates a thickness-changing point that is located between the width-changing point P3 and the medium facing surface ABS. A thickness of the main pole layer 20 taken in a region closer to the medium facing surface ABS than the thickness-changing point P2 is equal to a thickness T2 of the main pole layer 20 taken in the medium facing surface ABS, while a thickness of the main pole layer 20 taken in a region farther from the medium facing surface ABS than the thickness-changing point P2 is greater than the thickness T2 of the main pole layer 20 taken in the medium facing surface ABS. The thickness T2 of the main pole layer 20 taken in the medium facing surface ABS is 0.05 to 0.3 μm, for example.

Figure 24:
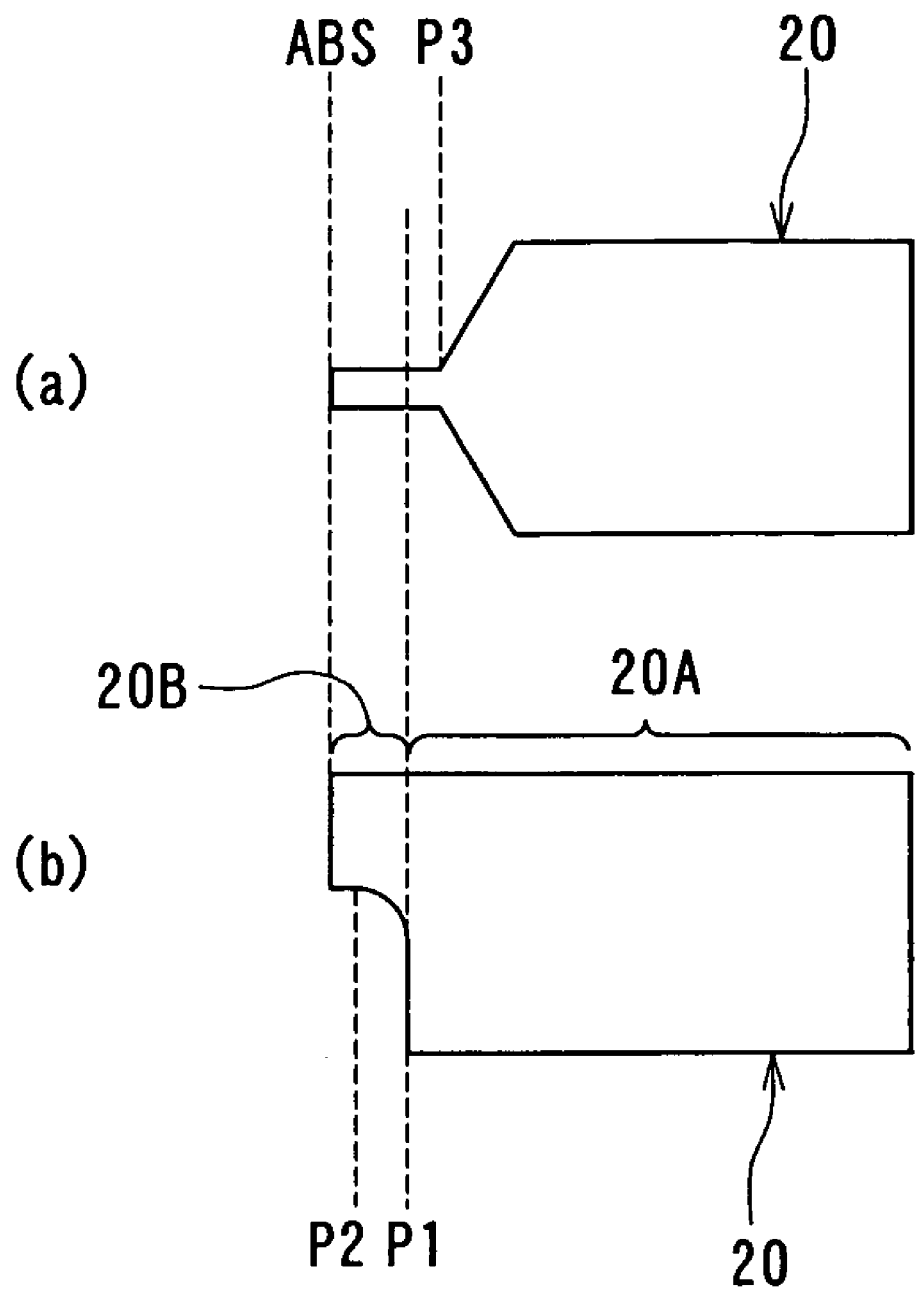
FIG. 24 illustrates another example of the shape of the main pole layer of the magnetic head of the first embodiment.
Figure 25:
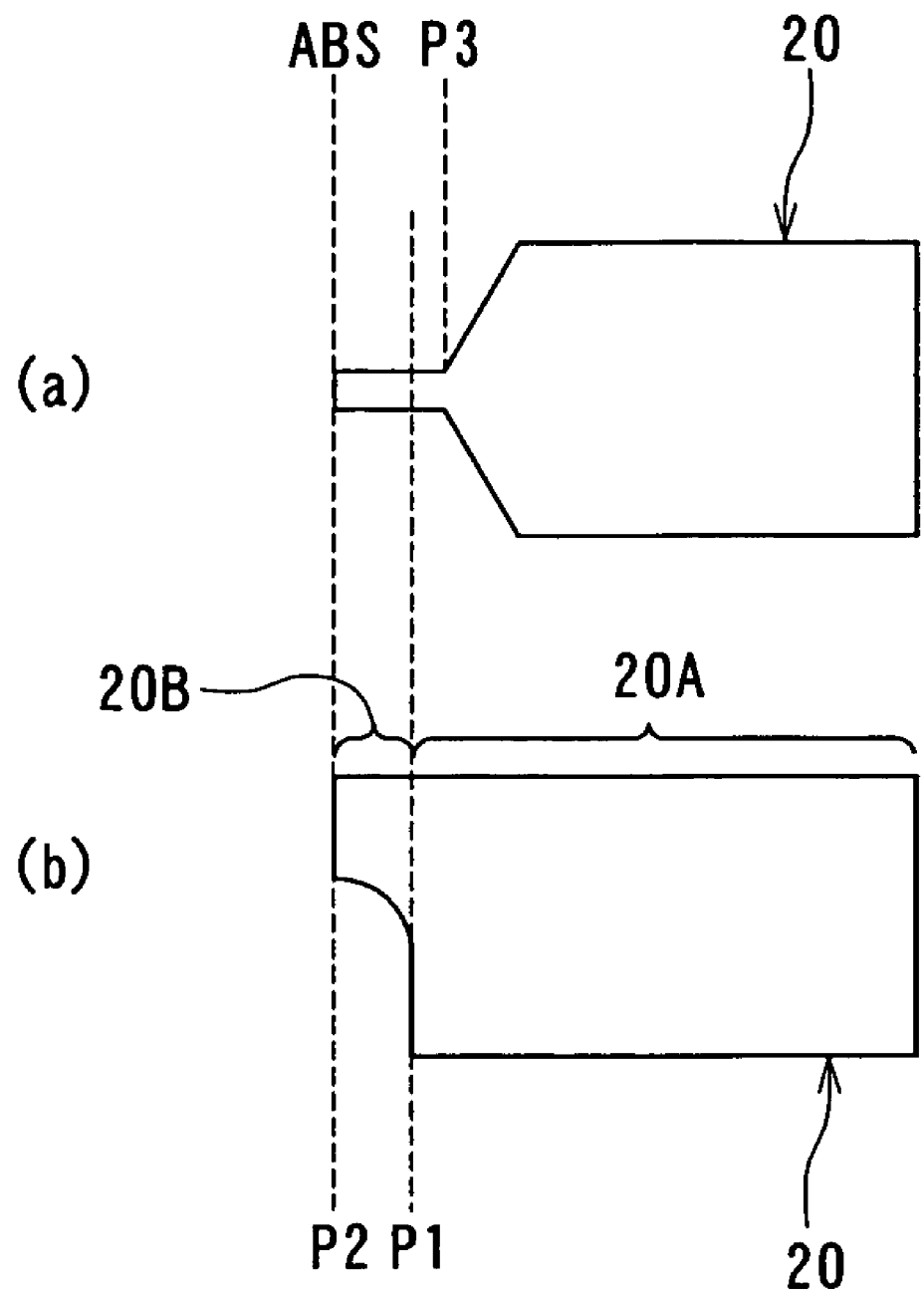
FIG. 25 illustrates still another example of the shape of the main pole layer of the magnetic head of the first embodiment.

As shown in FIG. 3(b), in a region from the boundary P1 between the first and second portions 20A and 20B to the point P2 that is closer to the medium facing surface ABS than the boundary P1, the thickness of the second portion 20B gradually decreases with decreasing distance from the medium facing surface ABS. FIG. 1 and FIG. 3(b) show that, in a region between P1 and P2, the surface of the second portion 20B closer to the gap layer 9 (that is, the bottom surface) is formed to be a slanted surface having no projections and depresssions. However, as shown in FIG. 24, the surface may be curved in the region between P1 and P2. In addition, as shown in FIG. 25, the thickness-changing point P2 may be located in the medium facing surface ABS. FIG. 24(a) and FIG. 25(a) are top views of the main pole layer 20. FIG. 24(b) and FIG. 25(b) are side views of the main pole layer 20.

Figure 26:
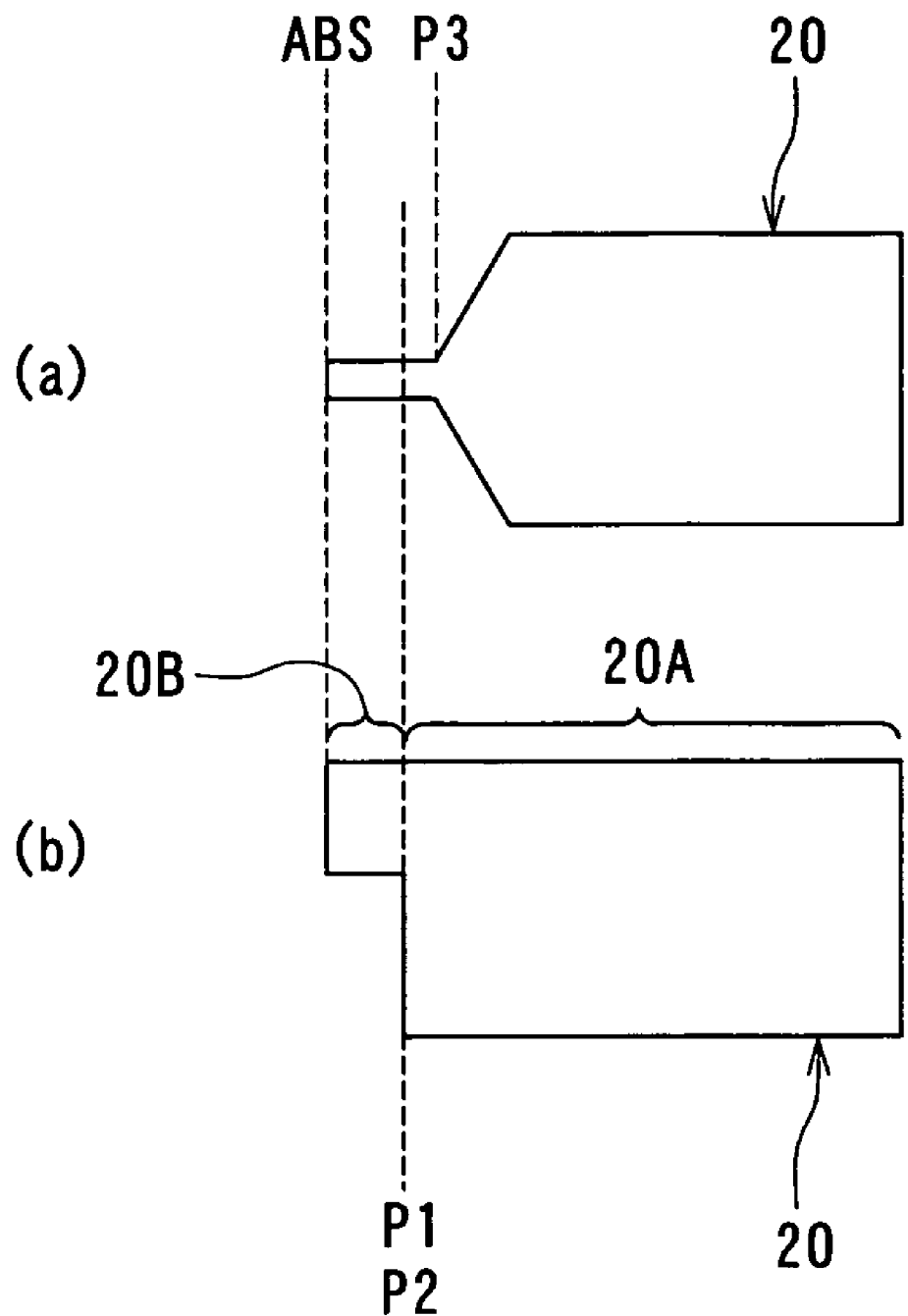
FIG. 26 illustrates still another example of the shape of the main pole layer of the magnetic head of the first embodiment.

As shown in FIG. 26, the positions of P1 and P2 may coincide with each other. In this case, the region in which the thickness of the second portion 20B gradually decreases with decreasing distance from the medium facing surface ABS is eliminated. FIG. 26(a) is a top view of the main pole layer 20, and FIG. 26(b) is a side view of the main pole layer 20.

As shown in FIG. 3(a), in the region farther from the medium facing surface ABS than the width-changing point P3, the width of the main pole layer 20 gradually increases with increasing distance from the medium facing surface ABS, and then finally becomes constant. In the main pole layer 20, each sidewall of the portion in which the width gradually increases with increasing distance from the medium facing surface ABS may form any angle θ with respect to the direction orthogonal to the medium facing surface ABS. For example, the angle θ may be about 30 degrees.

Here, specific dimensions of various parts of the main pole layer 20 shown in FIG. 3 are given by way of example. In this example, the distance L1 between the medium facing surface ABS and the width-changing point P3 is 0.35 μm. The distance L2 between the medium facing surface ABS and the thickness-changing point P2 is 0.15 μm. The distance L3 between the medium facing surface ABS and the boundary P1 is 0.25 μm. The thickness T2 of the main pole layer 20 taken in the medium facing surface ABS is 0.2 μm. The amount of change T3 in thickness of the main pole layer 20 between the positions of P1 and P2 is 0.1 μm. The thickness T1 of the first portion 20A is 0.4 μm. The width W1 of the main pole layer 20 taken in the medium facing surface ABS is 0.2 μm.

The operation of the magnetic head according to the first embodiment will now be described. The magnetic head writes data on a recording medium by using the write head and reads data written on the recording medium by using the read head. In the write head, the thin-film coil 10 generates a magnetic field that corresponds to the data to be written on the recording medium. The auxiliary pole layer 8, the main pole layer 20 and the yoke layer 11 form a magnetic path through which a magnetic flux corresponding to the magnetic field generated by the thin-film coil 10 passes. The main pole layer 20 allows the magnetic flux corresponding to the magnetic field generated by the thin-film coil 10 to pass and generates a write magnetic field used for writing the data on the recording medium through the use of the perpendicular magnetic recording system.

Reference is now made to FIG. 4A to FIG. 22A, FIG. 4B to FIG. 22B, and FIG. 15C to FIG. 22C to describe a method of manufacturing the magnetic head of the first embodiment. FIG. 4A to FIG. 22A are cross sections of portions of layered structures obtained through the manufacturing process of the magnetic head that are located near the medium facing surface, the cross sections being parallel to the medium facing surface. FIG. 4B to FIG. 22B are cross sections of the layered structures orthogonal to the medium facing surface and the substrate. FIG. 15C to FIG. 22C are top views of the layered structures. The substrate 1 and the insulating layer 2 are omitted in FIG. 4A to FIG. 22A, FIG. 4B to FIG. 22B and FIG. 15C to FIG. 22C.

According to the method of manufacturing the magnetic head of the embodiment, first, the insulating layer 2 is formed on the substrate 1. Next, the bottom shield layer 3 is formed on the insulating layer 2. Next, an insulating film that constitutes a portion of the insulating layer 4 is formed on the bottom shield layer 3. On this insulating film, the MR element 5 and a lead not shown that is connected to the MR element 5 are formed. Next, the MR element 5 and the lead are covered with another insulating film that constitutes the other portion of the insulating layer 4, so that the MR element 5 and the lead are embedded in the insulating layer 4. Next, the top shield layer 6 is formed on the insulating layer 4. Next, the nonmagnetic layer 7 is formed on the top shield layer 6. On the nonmagnetic layer 7, the auxiliary pole layer 8 is formed into a specific shape. Next, although not shown, the nonmagnetic layer 7 and the auxiliary pole layer 8 are covered with a nonmagnetic material such as alumina, and the nonmagnetic material is polished so that the auxiliary pole layer 8 is exposed and the top surface of the auxiliary pole layer 8 is flattened. The layered structure obtained through the foregoing steps is shown in FIG. 4A and FIG. 4B. It is possible that the nonmagnetic layer 7 is not provided, and the top shield layer 6 and the auxiliary pole layer 8 may be replaced with a single magnetic layer that functions as both of the top shield layer 6 and the auxiliary pole layer 8.

Next, as shown in FIG. 5A and FIG. 5B, the insulating layer 9A having a specific shape is formed on the auxiliary pole layer 8 by sputtering. For example, the insulating layer 9A may be formed by lift-off, or by selectively etching an insulating film formed by sputtering.

Next, as shown in FIG. 6A and FIG. 6B, the thin-film coil 10 is formed on the insulating layer 9A, using known techniques of photolithography and film formation such as electroplating.

Next, as shown in FIG. 7A and FIG. 7B, the insulating layer 9B to fill at least the space between adjacent ones of the turns of the thin-film coil 10 is formed using a known technique of photolithography. Here, the insulating layer 9B is formed to cover the thin-film coil 10 completely. Alternatively, it is possible that the insulating layer 9B is formed to fill the space between adjacent ones of the turns of the thin-film coil 10, and then another insulating layer is formed to cover the coil 10 and the insulating layer 9B.

Next, as shown in FIG. 8A and FIG. 8B, the yoke layer 11 is formed on the auxiliary pole layer 8 and the insulating layer 9B to extend from the position of the center of the thin-film coil 10 to a specific point toward the medium facing surface ABS, using known techniques of photolithography and film formation such as electroplating.

Next, as shown in FIG. 9A and FIG. 9B, the insulating layer 9C is formed by sputtering to cover the insulating layers 9A and 9B and the yoke layer 11.

Figure 10A:
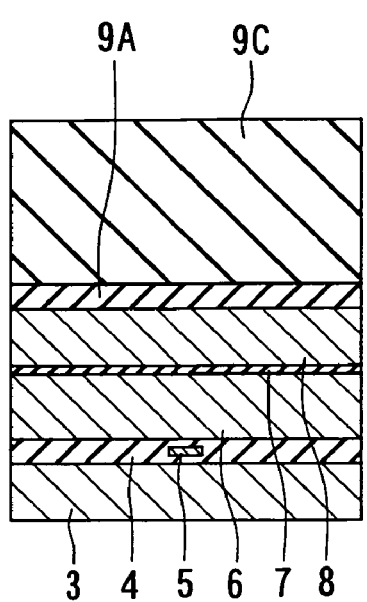
FIG. 10A and FIG. 10B are views for illustrating a step that follows the step shown in FIG. 9A and FIG. 9B.
Figure 10B:
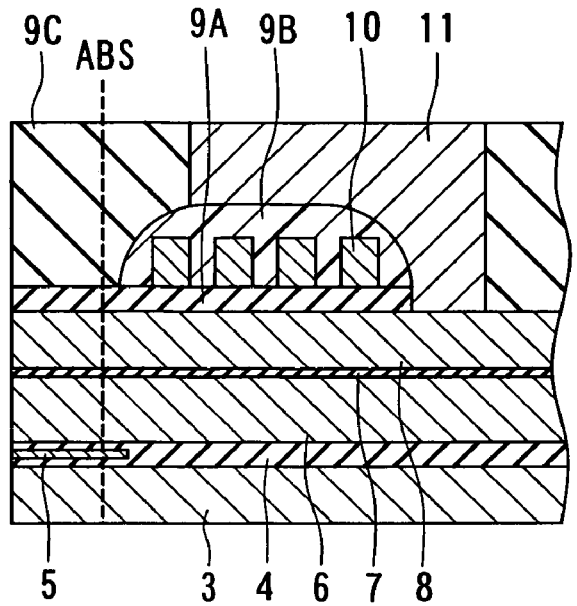

Next, as shown in FIG. 10A and FIG. 10B, the surface of the insulating layer 9C is polished by chemical mechanical polishing, for example, so that the yoke layer 11 is exposed and the top surfaces of the insulating layer 9C and the yoke layer 11 are flattened.

Figure 11A:
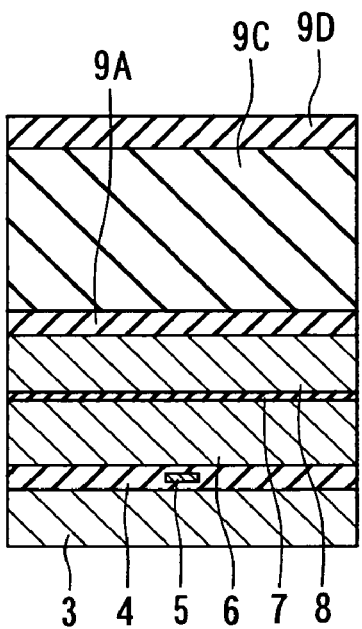
FIG. 11A and FIG. 11B are views for illustrating a step that follows the step shown in FIG. 10A and FIG. 10B.
Figure 11B:
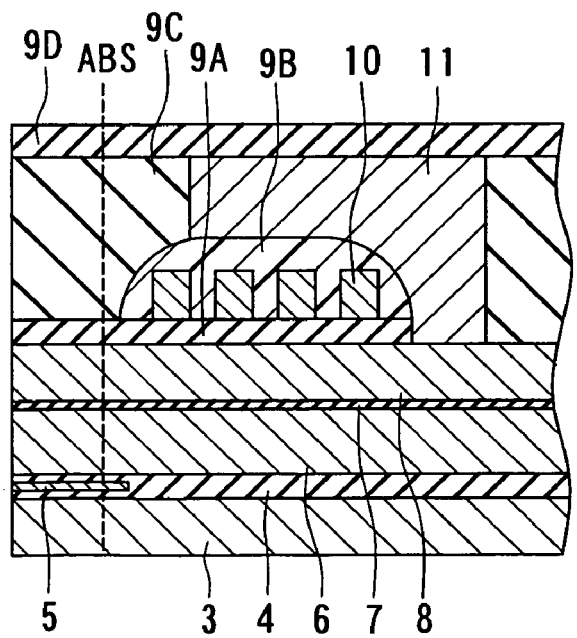

Next, as shown in FIG. 11A and FIG. 11B, the nonmagnetic layer 9D is formed by sputtering on the entire top surface of the layered structure thus obtained.

Next, as shown in FIG. 12A and FIG. 12B, the nonmagnetic electrode film 9E is formed on the nonmagnetic layer 9D by sputtering.

FIG. 13A and FIG. 13B illustrate the next step. In this step, first, a frame 15 made of a photoresist is formed on the nonmagnetic electrode film 9E by photolithography. The frame 15 has a space inside. The space is located in a region that includes a region in which the first portion 20A of the main pole layer 20 is to be disposed. One of ends of the space closer to the medium facing surface ABS is located at a position that coincides with the position at which one of ends of the first portion 20A closer to the medium facing surface ABS is to be located. Next, a plating layer 16 is formed in the space of the frame 15 by plating, or electroplating in particular. At this time, a current is fed to the nonmagnetic electrode film 9E. The plating layer 16 may be made of any conductive material that is capable of plating and that can be etched easily. The material of the plating layer 16 may be NiFe, for example. One of ends of the plating layer 16 closer to the medium facing surface ABS is located at the position that coincides with the position at which the end of the first portion 20A closer to the medium facing surface ABS is to be located.

Figure 14A:
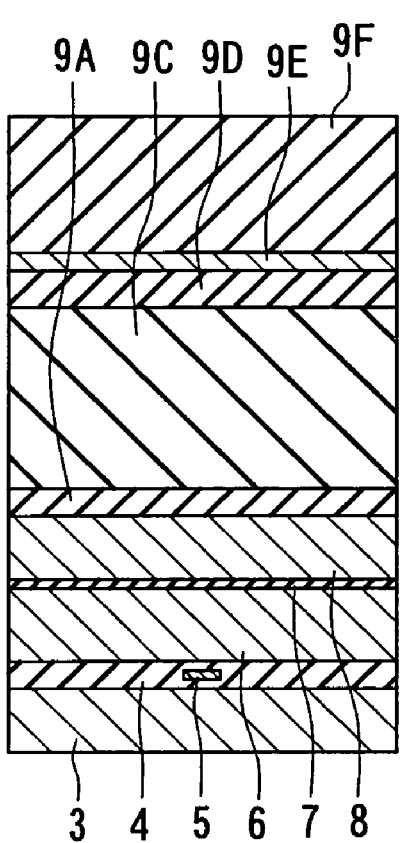
FIG. 14A and FIG. 14B are views for illustrating a step that follows the step shown in FIG. 13A and FIG. 13B.
Figure 14B:
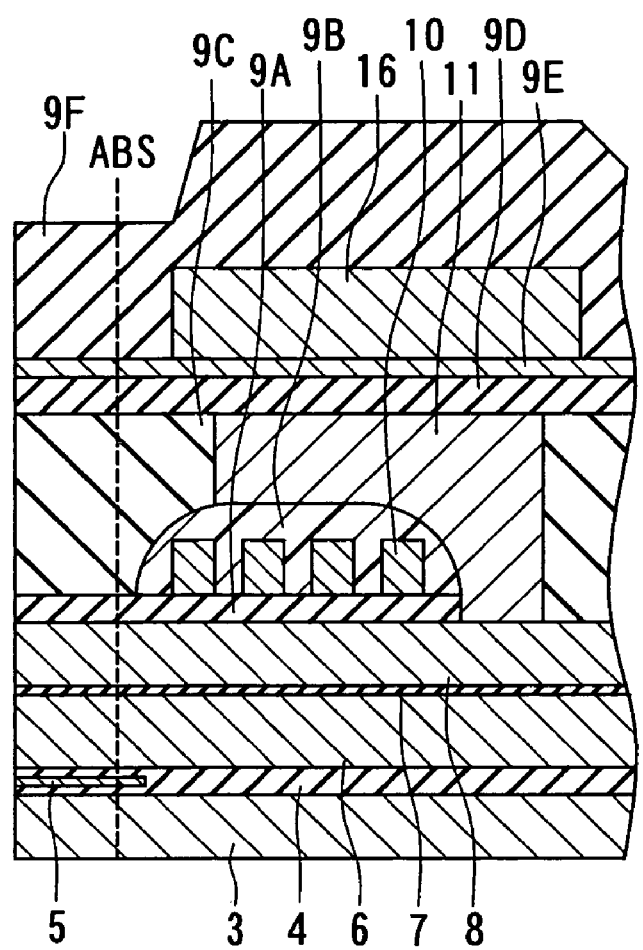

Next, as shown in FIG. 14A and FIG. 14B, the frame 15 is removed and then the nonmagnetic layer 9F is formed by sputtering to cover the plating layer 16. The nonmagnetic layer 9F corresponds to the first nonmagnetic layer of the invention.

Figure 15A:
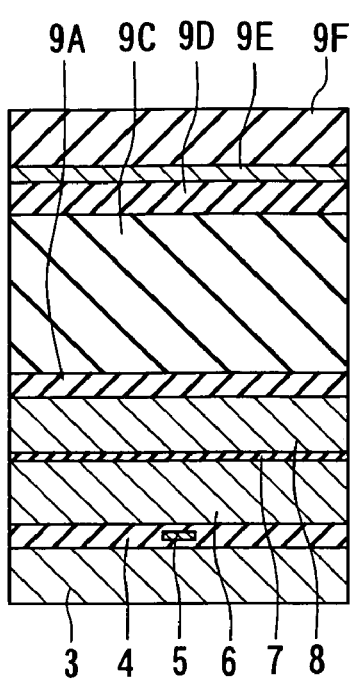
FIG. 15A to FIG. 15C are views for illustrating a step that follows the step shown in FIG. 14A and FIG. 14B.
Figure 15B:
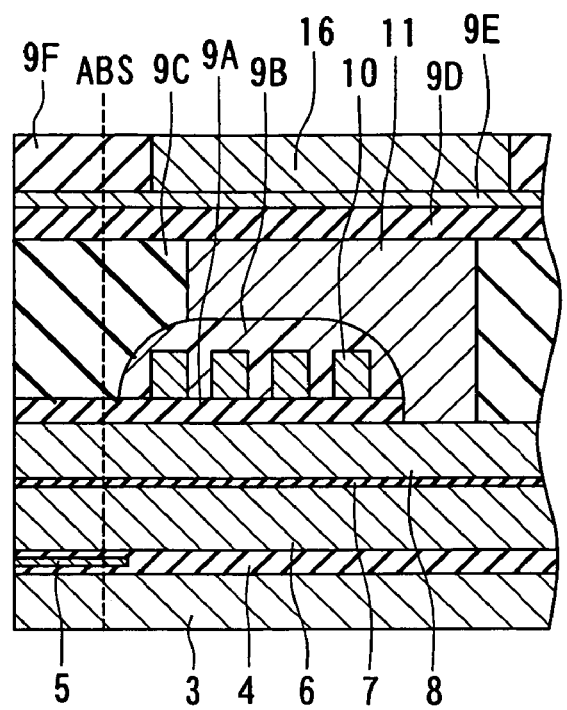
Figure 15C:
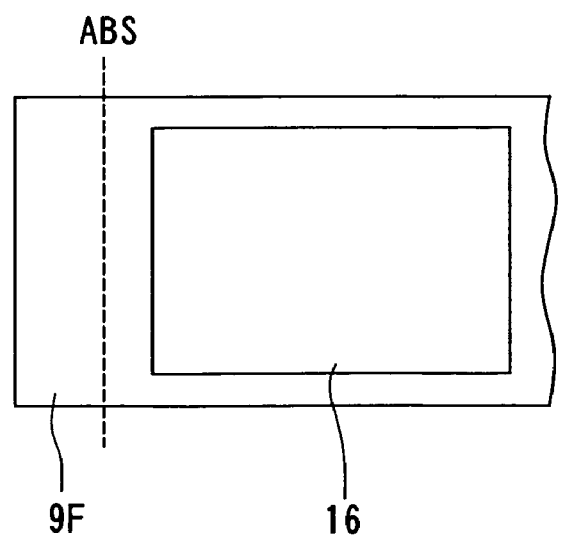

Next, as shown in FIG. 15A to FIG. 15C, the surface of the nonmagnetic layer 9F is polished by chemical mechanical polishing, for example, so that the plating layer 16 is exposed and the top surfaces of the nonmagnetic layer 9F and the plating layer 16 are flattened. The nonmagnetic layer 9F is thereby patterned into such a shape that the nonmagnetic layer 9F is adjacent to the plating layer 16.

Figure 16A:
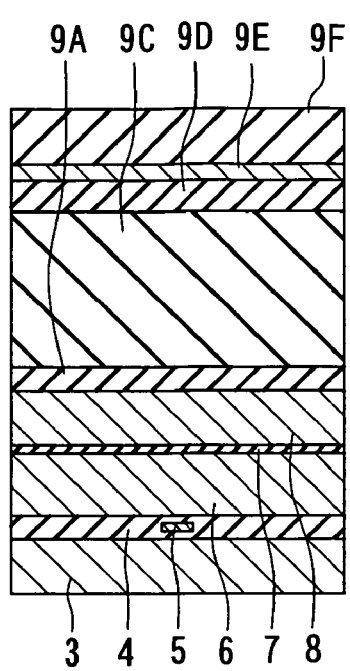
FIG. 16A to FIG. 16C are views for illustrating a step that follows the step shown in FIG. 15A to FIG. 15C.
Figure 16B:
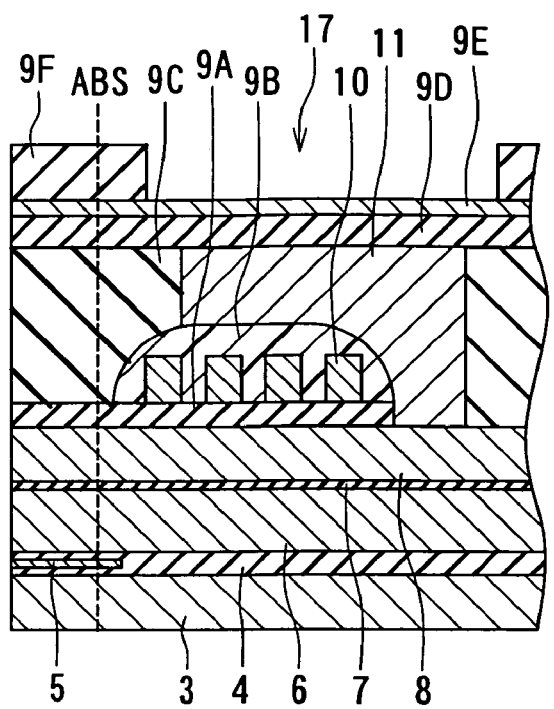
Figure 16C:
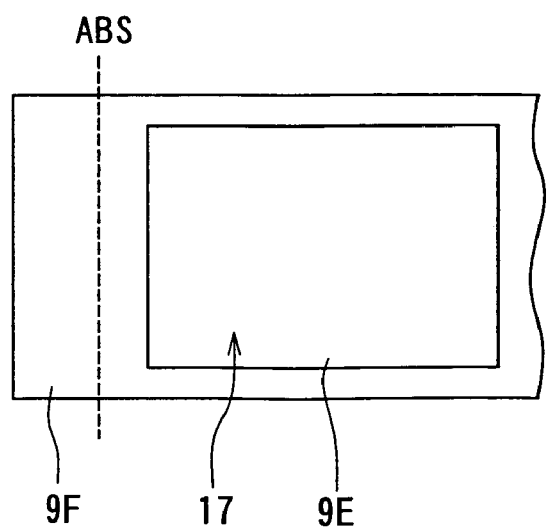

Next, as shown in FIG. 16A to FIG. 16C, the plating layer 16 is removed by wet etching. A space 17 is thereby formed. The space 17 is adjacent to the nonmagnetic layer 9F and has a shape corresponding to the shape of the plating layer 16.

Next, as shown in FIG. 17A to FIG. 17C, the nonmagnetic electrode film 9E and the nonmagnetic layer 9D are selectively etched by dry etching such as ion milling, using the nonmagnetic layer 9F as a mask. The bottom of the space 17 thereby reaches the top surface of the yoke layer 11. In this step, a portion of the edge formed by the wall of the nonmagnetic layer 9F facing toward the space 17 and the top surface of the nonmagnetic layer 9F, the portion being near the position of the boundary between the first and second portions 20A, 20B of the main pole layer 20 to be formed later, may be removed by the above-mentioned dry etching. In this case, as shown in FIG. 1 and FIG. 3(b), in the region from the boundary P1 between the first and second portions 20A, 20B to the specific point P2 closer to the medium facing surface ABS than the boundary P1, the thickness of the second portion 20B gradually decreases with decreasing distance from the medium facing surface ABS.

FIG. 17B shows an example in which the portion of the edge is removed to form a slanting surface having no projections and depressions. In this case, the main pole layer 20 has the shape shown in FIG. 1 and FIG. 3(b). It is possible that the portion of the edge is removed to form a curved surface. In this case, the main pole layer 20 has the shape shown in FIG. 24(b). It is also possible that the position of the medium-facing-surface-side end of the portion to be removed coincides with the position of the medium facing surface ABS. In this case, the main pole layer 20 has the shape shown in FIG. 25(b). If the edge is not removed at all, the main pole layer 20 has the shape shown in FIG. 26(b). In this case, to establish magnetic connection between the main pole layer 20 and the yoke layer 11, it is necessary that the above-mentioned edge is covered with a photoresist by photolithography, and then portions of the nonmagnetic layer 9D and the nonmagnetic electrode film 9E lying on the top surface of the yoke layer 11 are selectively removed by dry etching so that the top surface of the yoke layer 11 is exposed.

FIG. 18A to FIG. 18C illustrate the next step. In this step, first, the magnetic electrode film 201 is formed by sputtering on the entire top surface of the layered structure thus obtained. Next, a frame 18 made of a photoresist is formed on the magnetic electrode film 201 by photolithography. The frame 18 has a space inside. The space has a plane geometry corresponding to that of the main pole layer 20.

Figure 19A:
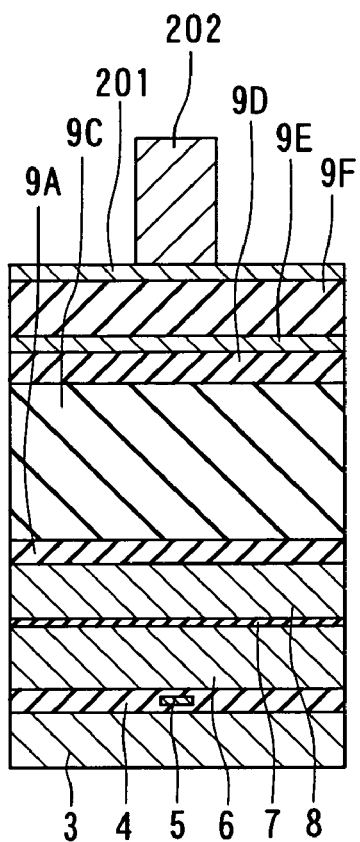
FIG. 19A to FIG. 19C are views for illustrating a step that follows the step shown in FIG. 18A to FIG. 18C.
Figure 19B:
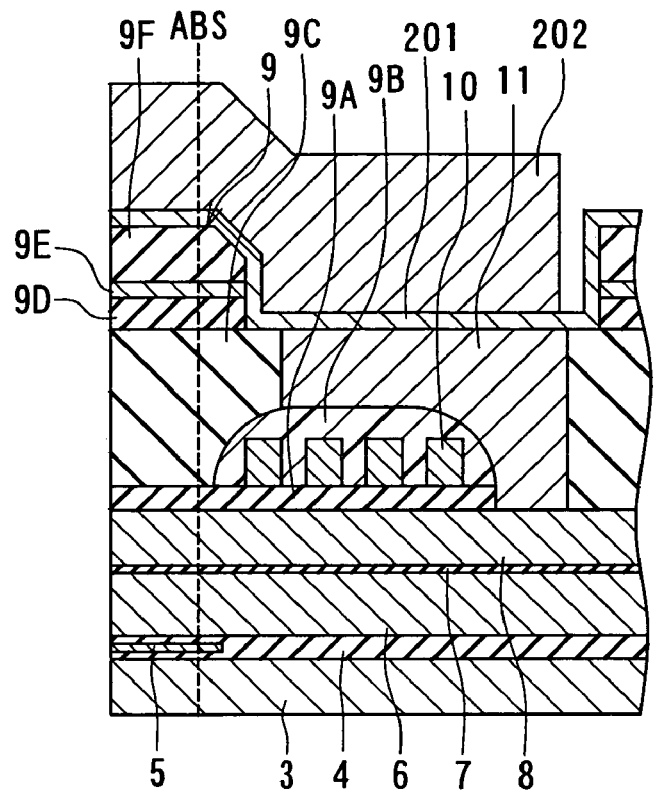
Figure 19C:
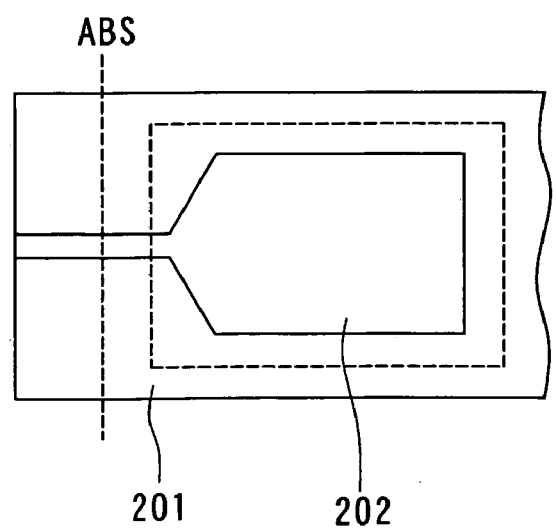

FIG. 19A to FIG. 19C illustrate the next step. In this step, first, the plating layer 202 is formed in the space of the frame 18 by plating, or electroplating in particular. At this time, a current is fed to the magnetic electrode film 201. Next, the frame 18 is removed.

Figure 20A:
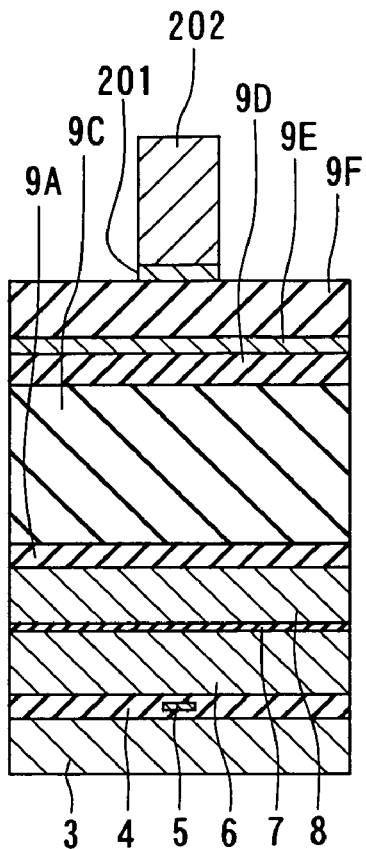
FIG. 20A to FIG. 20C are views for illustrating a step that follows the step shown in FIG. 19A to FIG. 19C.
Figure 20B:
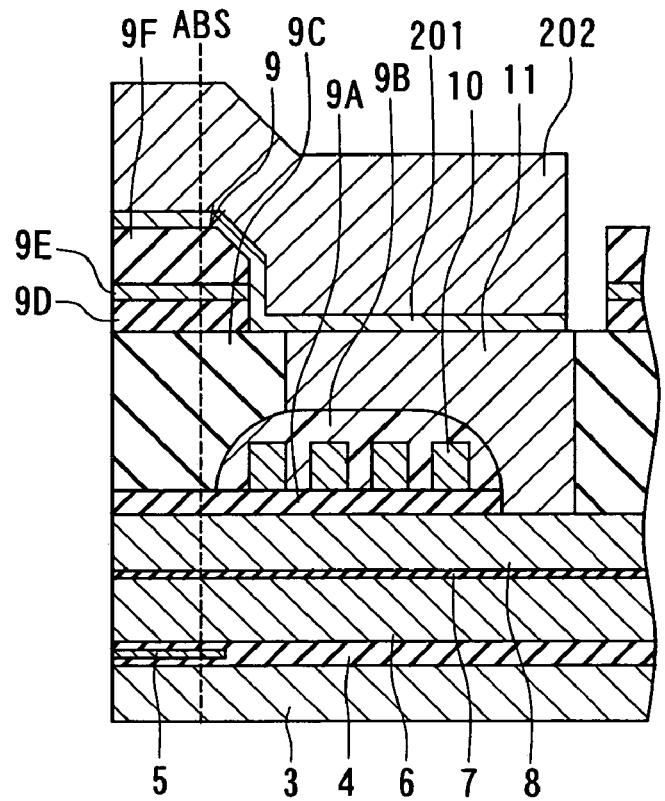
Figure 20C:
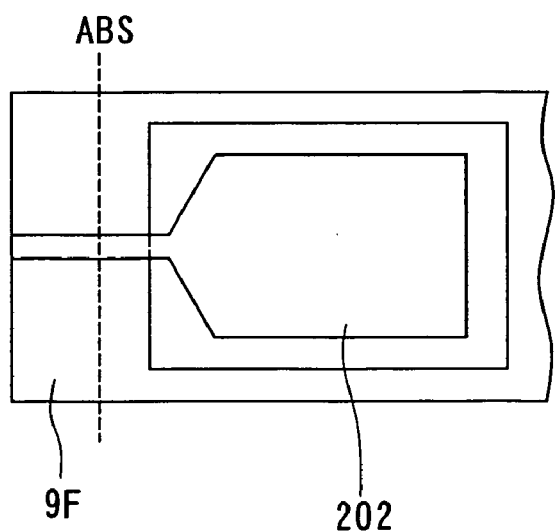

Next, as shown in FIG. 20A to FIG. 20C, the magnetic electrode film 201 except a portion below the plating layer 202 is etched by dry etching such as ion milling or reactive ion etching, using the plating layer 202 as a mask. At this time, two sidewalls of a portion of the layered structure made up of the magnetic electrode film 201 and the plating layer 202, the portion extending from the medium facing surface ABS to the width-changing point P3, may be etched such that the distance between these sidewalls decreases with decreasing distance from the gap layer 9. It is thereby possible that, as shown in FIG. 23, the end of the main pole layer 20 located in the medium facing surface ABS has a shape of trapezoid in which the side closer to the gap layer 9 is shorter than the opposite side.

Next, as shown in FIG. 21A to FIG. 21C, the nonmagnetic layer 21 is formed to cover the layered structure made up of the magnetic electrode film 201 and the plating layer 202. The nonmagnetic layer 21 corresponds to the second nonmagnetic layer of the invention.

Figure 22A:
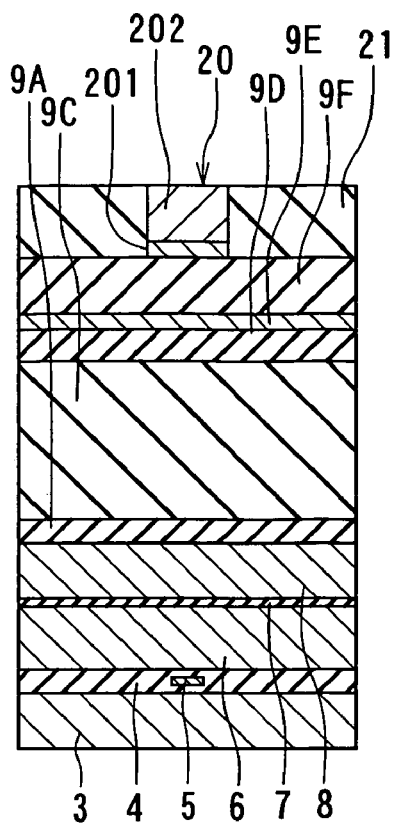
FIG. 22A to FIG. 22C are views for illustrating a step that follows the step shown in FIG. 21A to FIG. 21C.
Figure 22B:
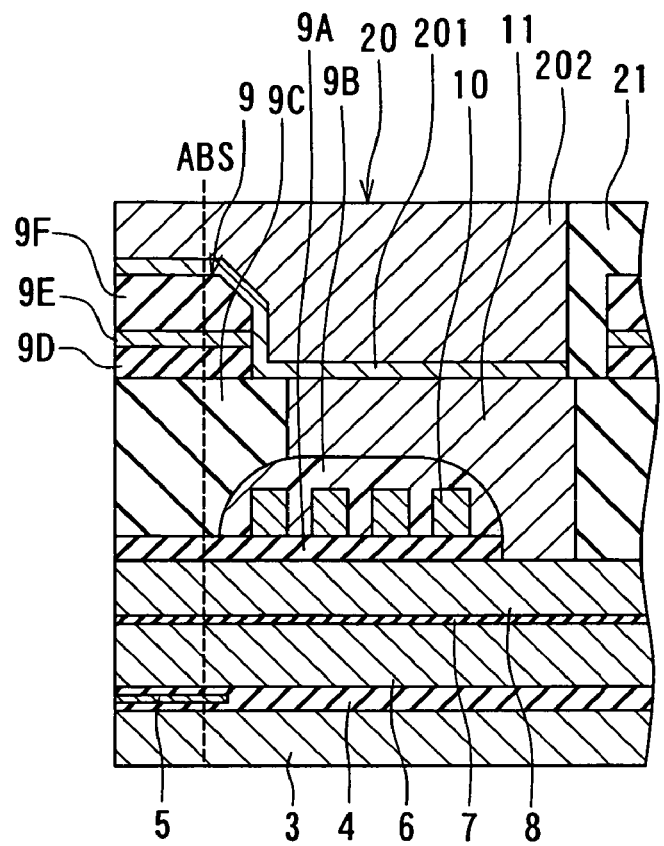
Figure 22C:
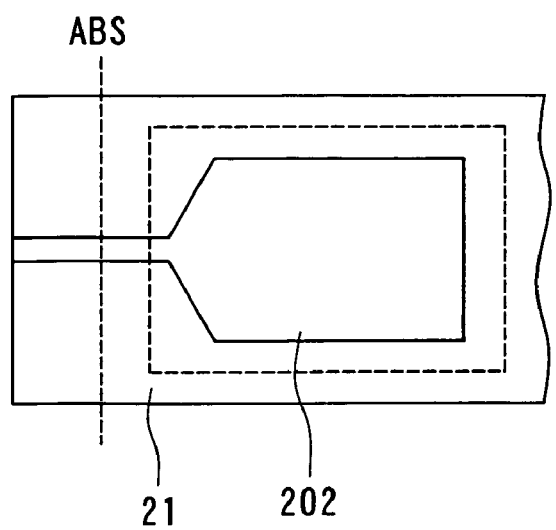

Next, as shown in FIG. 22A to FIG. 22C, the surface of the nonmagnetic layer 21 is polished by chemical mechanical polishing, for example, so that the plating layer 202 is exposed and the top surfaces of the nonmagnetic layer 21 and the plating layer 202 are flattened. The magnetic electrode film 201 and the plating layer 202 thereby make up the main pole layer 20.

Next, as shown in FIG. 1 and FIG. 2, the protection layer 22 is formed to cover the entire top surface of the layered structure thus obtained. Next, wiring and terminals are formed on the protection layer 22, the substrate is separated into sliders, and processes such as polishing of the medium facing surface ABS and fabrication of rails for flying are performed. The magnetic head is thus completed.

As described in the foregoing, according to the first embodiment, the main pole layer 20 is formed to include: the first portion 20A having a specific thickness, the end of the first portion 20A closer to the medium facing surface ABS being located at a distance from the medium facing surface ABS; and the second portion 20B having a thickness smaller than the thickness of the first portion 20A and disposed between the first portion 20A and the medium facing surface ABS. Thus, the main pole layer 20 decreases in thickness with decreasing distance from the medium facing surface ABS. As a result, according to the embodiment, it is possible to improve the overwrite property while preventing adjacent track erasing.

According to the embodiment, at least a portion of the surface of the main pole layer 20 farther from the gap layer 9, the portion being near the medium facing surface ABS, is substantially flat. As a result, in the medium facing surface ABS, the magnetic field generated from the main pole layer 20 is made consistent along the direction intersecting the tracks. Distortion of the bit pattern shape of the recording medium is thereby suppressed, and accordingly, the linear recording density is improved.

According to the embodiment, the position of the boundary P1 between the first portion 20A and the second portion 20B having different thicknesses is determined by the position of the end of the plating layer 16 closer to the medium facing surface ABS. The plating layer 16 is formed by plating in the step shown in FIG. 13A and FIG. 13B. The position of the end of the plating layer 16 closer to the medium facing surface ABS is controllable with higher precision, compared with the position of the boundary between the bottom surface and the side surface of a recess formed by dry etching. For example, the position of the boundary between the bottom surface and the side surface of a recess formed by dry etching varies by about ±0.15 µm. In contrast, the position of the end of the plating layer 16 closer to the medium facing surface ABS varies only by about ±0.04 µm. Thus, the embodiment makes it possible to precisely determine the position of the boundary P1 between the first and second portions 20A, 20B. As a result, it is possible to manufacture uniform magnetic heads.

In the embodiment, as shown in FIG. 17A to FIG. 17C, a portion of the edge formed by the wall of the nonmagnetic layer 9F facing toward the space 17 and the top surface of the nonmagnetic layer 9F, the portion being near the position of the boundary between the first and second portions 20A, 20B of the main pole layer 20, may be removed by dry etching. In this case, in the region from the boundary P1 between the first and second portions 20A, 20B to the specific point P2 closer to the medium facing surface ABS than the boundary P1, the thickness of the second portion 20B gradually decreases with decreasing distance from the medium facing surface ABS. As a result, the flow of the magnetic flux passing through the main pole layer 20 becomes smooth, and the overwrite property is thereby improved further.

In the embodiment, as shown in FIG. 23, the end of the main pole layer 20 located in the medium facing surface ABS may be made to have a shape of trapezoid in which the side closer to the gap layer 9 is shorter than the opposite side. In this case, it is possible to prevent adjacent track erasing with higher reliability.

In the embodiment, as shown in FIG. 3, the width of the main pole layer 20 taken in the region closer to the medium facing surface ABS than the specific width-changing point P3 located at a distance from the medium facing surface ABS is equal to the width W1 of the main pole layer 20 taken in the medium facing surface ABS, while the width of the main pole layer 20 taken in the region farther from the medium facing surface ABS than the width-changing point P3 is greater than the width W1 of the main pole layer 20 taken in the medium facing surface ABS. As a result, the main pole layer 20 is capable of efficiently introducing a magnetic flux of greater magnitude to the end of the main pole layer 20 located in the medium facing surface ABS, and the overwrite property is thereby improved further.

In addition, in the embodiment, the thickness of the main pole layer 20 taken in the region closer to the medium facing surface ABS than the thickness-changing point P2 located between the width-changing point P3 and the medium facing surface ABS is equal to the thickness T2 of the main pole layer 20 taken in the medium facing surface ABS, while the thickness of the main pole layer 20 taken in the region farther from the medium facing surface ABS than the thickness-changing point P2 is greater than the thickness T2 of the main pole layer 20 taken in the medium facing surface ABS. According to the embodiment, it is possible to increase components orthogonal to the surface of the recording medium among components of the write magnetic field generated from the end of the main pole layer 20 located in the medium facing surface ABS, compared with a case in which the thickness-changing point P2 coincides with the width-changing point P3, and a case in which the thickness-changing point P2 is farther from the medium facing surface ABS than the width-changing point P3. As a result, it is possible to improve the overwrite property while preventing adjacent track erasing with higher reliability.

Figure 27:
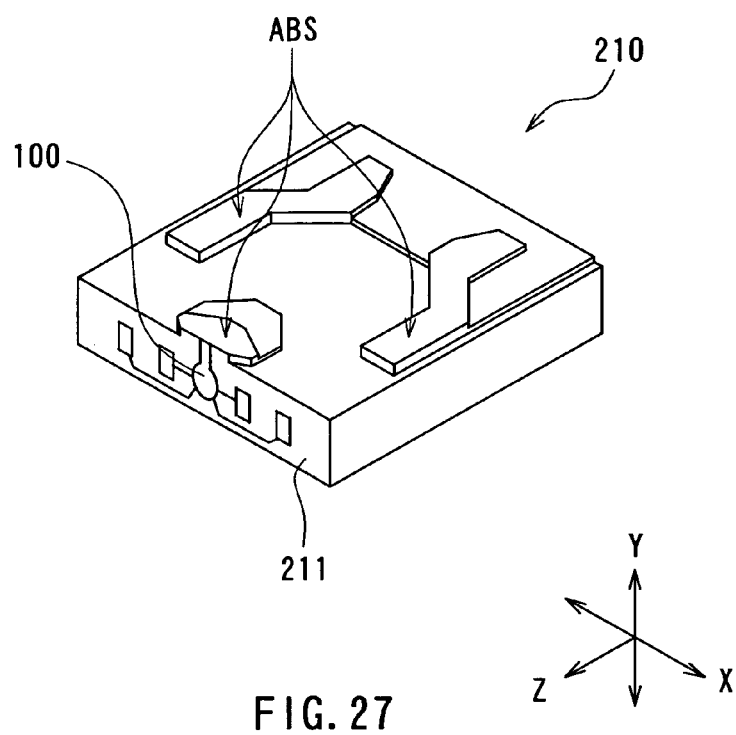
FIG. 27 is a perspective view that illustrates a slider incorporated in a head gimbal assembly of the first embodiment.

A head gimbal assembly and a hard disk drive of the embodiment will now be described. Reference is made to FIG. 27 to describe a slider 210 incorporated in the head gimbal assembly. In the hard disk drive, the slider 210 is placed to face toward a hard disk platter that is a circular-plate-shaped recording medium to be rotated and driven. The slider 210 has a base body 211 made up mainly of the substrate 1 and the protection layer 22 of FIG. 1. The base body 211 is nearly hexahedron-shaped. One of the six surfaces of the base body 211 faces toward the hard disk platter. The medium facing surface (air bearing surface) ABS is formed in this one of the surfaces. When the hard disk platter rotates in direction Z of FIG. 27, an airflow passes between the hard disk platter and the slider 210 and a lift is thereby generated below the slider 210 in direction Y of FIG. 27 and exerted on the slider 210. The slider 210 flies over the hard disk platter by means of the lift. Direction X of FIG. 27 is a direction across the tracks of the hard disk platter. A magnetic head 100 of the embodiment is formed near the air-outflow-side end (the end located at the lower left of FIG. 27) of the slider 210.

Figure 28:
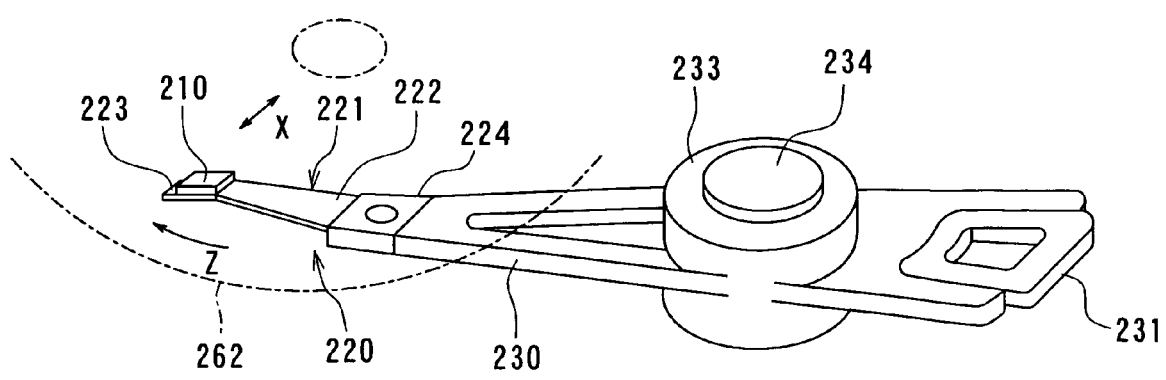
FIG. 28 is a perspective view that illustrates a head arm assembly including the head gimbal assembly of the first embodiment.

Reference is now made to FIG. 28 to describe a head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator for moving the slider 210 along the direction X across the tracks of the hard disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a carriage having a plurality of arms wherein the head gimbal assembly 220 is attached to each of the arms is called a head stack assembly.

FIG. 28 illustrates an example of the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 29:
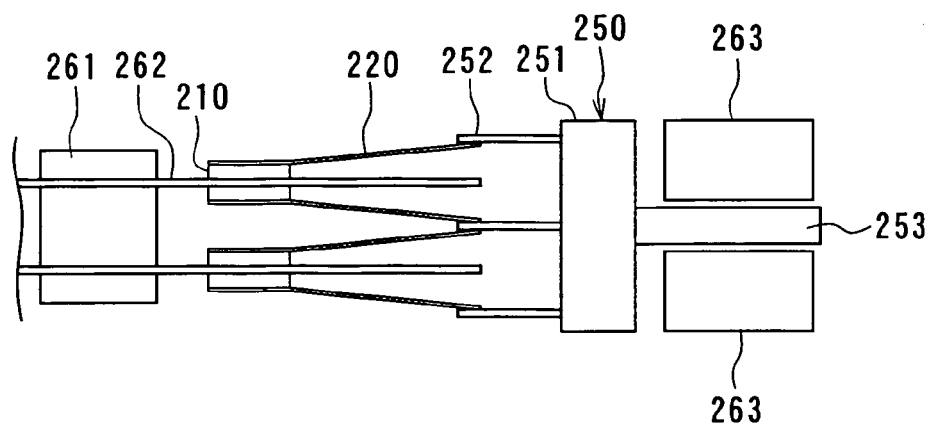
FIG. 29 illustrates the main part of a hard disk drive of the first embodiment.
Figure 30:
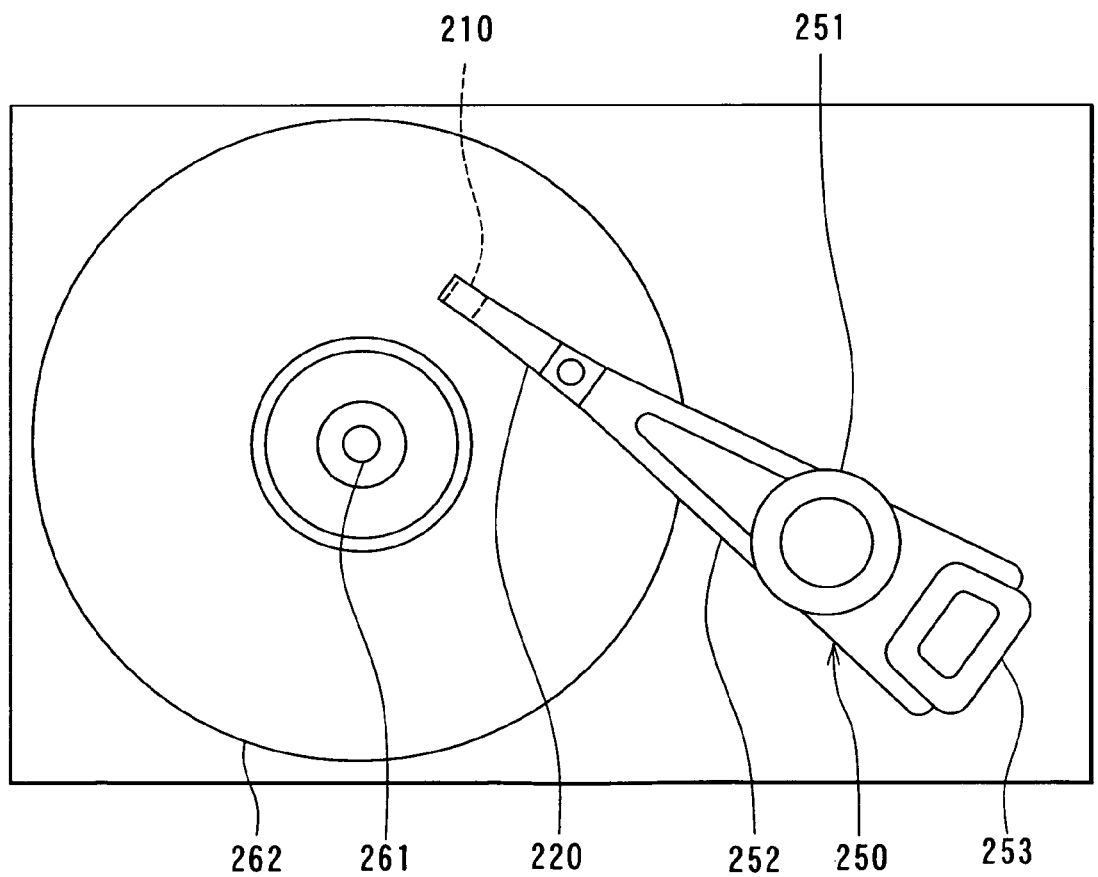
FIG. 30 is a top view of the hard disk drive of the first embodiment.

Reference is now made to FIG. 29 and FIG. 30 to describe an example of the head stack assembly and the hard disk drive of the embodiment. FIG. 29 illustrates the main part of the hard disk drive. FIG. 30 is a top view of the hard disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other with the coil 253 of the head stack assembly 250 placed between the magnets 263.

The actuator and the head stack assembly 250 except the sliders 210 support the sliders 210 and align them with respect to the hard disk platters 262.

In the hard disk drive of the embodiment, the actuator moves the slider 210 across the tracks of the hard disk platter 262 and aligns the slider 210 with respect to the hard disk platter 262. The magnetic head incorporated in the slider 210 writes data on the hard disk platter 262 through the use of the write head and reads data stored on the hard disk platter 262 through the use of the read head.

[Second Embodiment]

Reference is now made to FIG. 31A to FIG. 36A, FIG. 31B to FIG. 36B, and FIG. 31C to FIG. 36C to describe a method of manufacturing a magnetic head of a second embodiment of the invention. FIG. 31A to FIG. 36A are cross sections of portions of layered structures obtained through the manufacturing process of the magnetic head that are located near the medium facing surface, the cross sections being parallel to the medium facing surface. FIG. 31B to FIG. 36B are cross sections of the layered structures orthogonal to the medium facing surface and the substrate. FIG. 31C to FIG. 36C are top views of the layered structures. The substrate 1 and the insulating layer 2 are omitted in FIG. 31A to FIG. 36A, FIG. 31B to FIG. 36B and FIG. 31C to FIG. 36C.

The method of manufacturing the magnetic head of the second embodiment includes the same steps as the first embodiment up to the step shown in FIG. 17A to FIG. 17C. In the next step of the second embodiment, as shown in FIG. 31A to FIG. 31C, a magnetic layer 20P is formed by sputtering on the entire top surface of the layered structure thus obtained. The magnetic layer 20P will be the main pole layer 20 later.

Figure 32A:
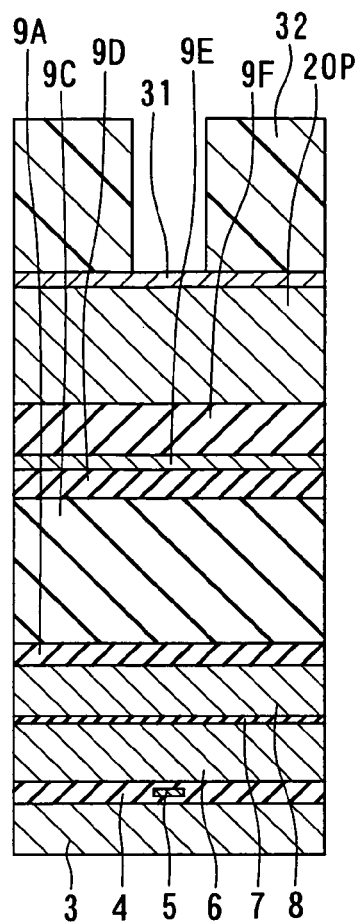
FIG. 32A to FIG. 32C are views for illustrating a step that follows the step shown in FIG. 31A to FIG. 31C.
Figure 32B:
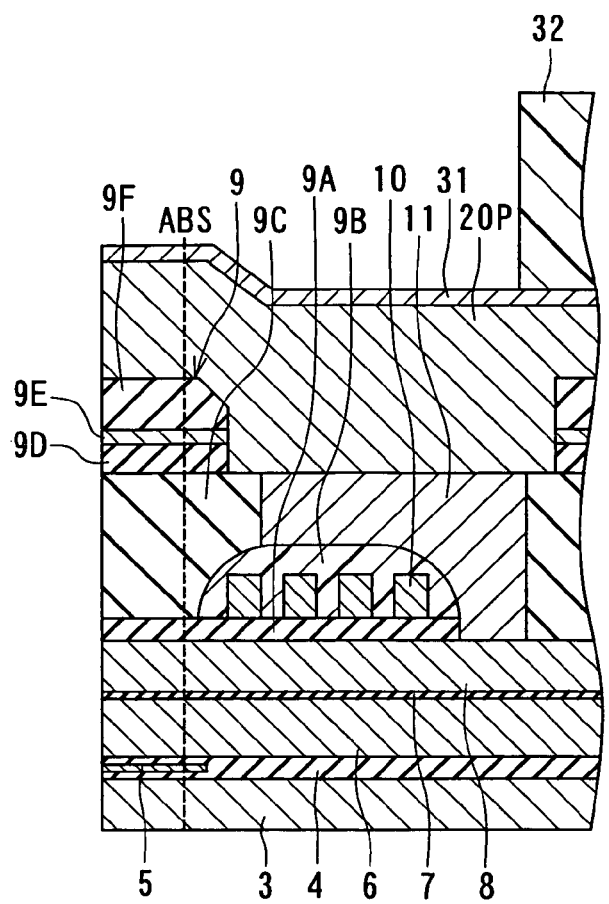
Figure 32C:
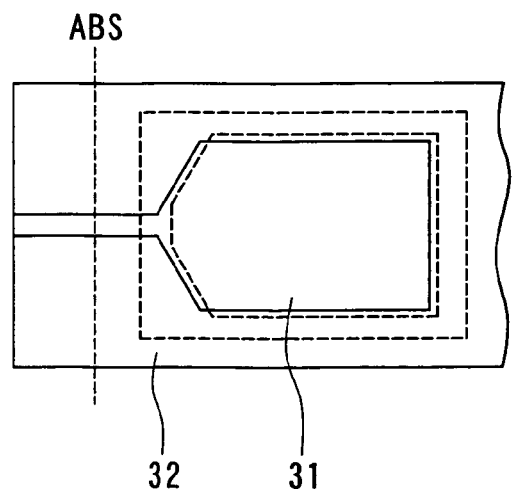

FIG. 32A to FIG. 32C illustrate the next step. In this step, first, an electrode film 31 is formed by sputtering on the entire top surface of the layered structure thus obtained. The electrode film 31 is made of a conductive material, which may be magnetic or nonmagnetic. Next, a frame 32 made of a photoresist is formed on the electrode film 31 by photolithography. The frame 32 has a space inside. The space has a plane geometry corresponding to that of the main pole layer 20.

Figure 33A:
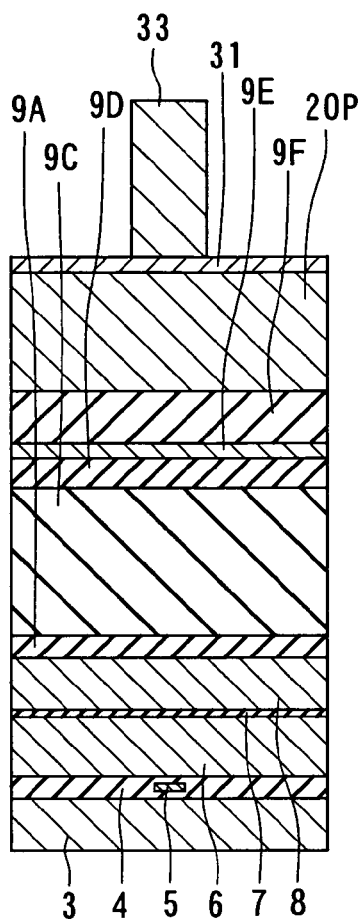
FIG. 33A to FIG. 33C are views for illustrating a step that follows the step shown in FIG. 32A to FIG. 32C.
Figure 33B:
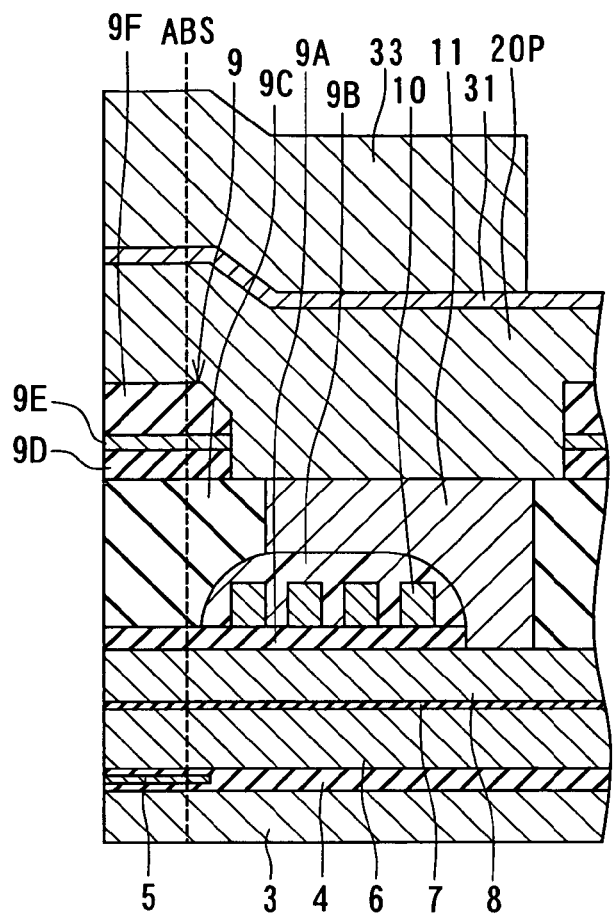
Figure 33C:
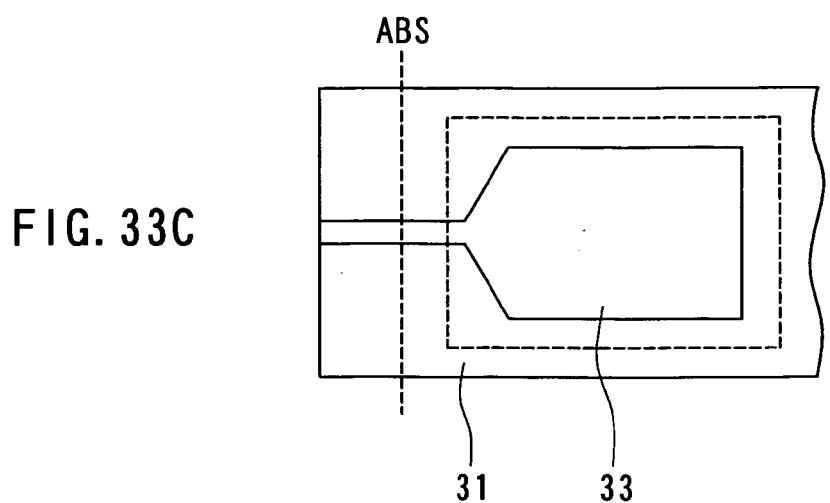

FIG. 33A to FIG. 33C illustrate the next step. In this step, first, a plating layer 33 is formed in the space of the frame 32 by plating, or electroplating in particular. At this time, a current is fed to the electrode film 31. The plating layer 33 may be made of NiFe, for example, although not limited to a specific material. Then, the frame 32 is removed.

Next, as shown in FIG. 34A to FIG. 34C, the electrode film 31 and the magnetic layer 20P are selectively etched by dry etching such as ion milling or reactive ion etching, using the plating layer 33 as a mask. At this time, two sidewalls of a portion of the magnetic layer 20P, the portion extending from the medium facing surface ABS to the width-changing point P3, may be etched such that the distance between these sidewalls decreases with decreasing distance from the gap layer 9. It is thereby possible that, as shown in FIG. 23, the end of the main pole layer 20 located in the medium facing surface ABS has a shape of trapezoid in which the side closer to the gap layer 9 is shorter than the opposite side.

Figure 35A:
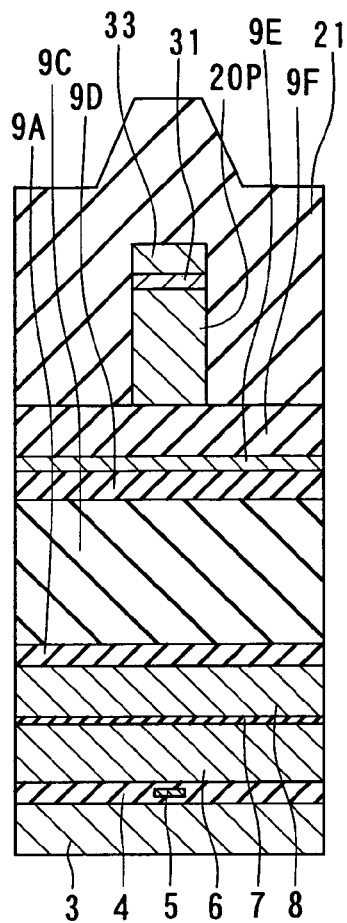
FIG. 35A to FIG. 35C are views for illustrating a step that follows the step shown in FIG. 34A to FIG. 34C.
Figure 35B:
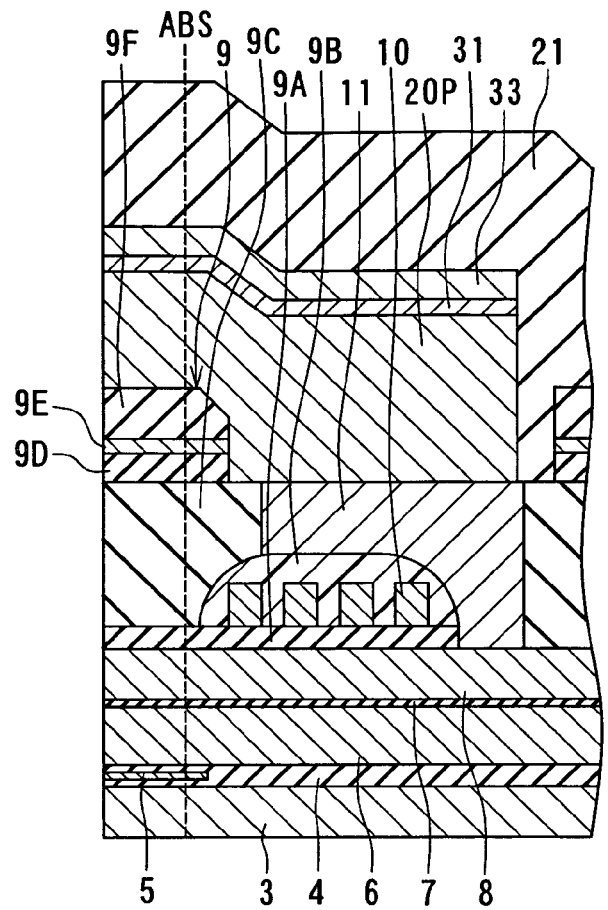
Figure 35C:
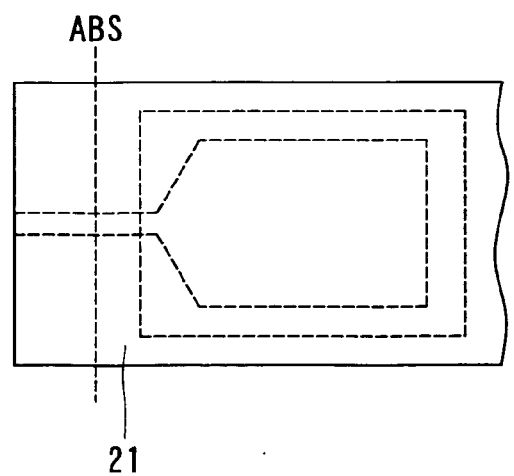

Next, as shown in FIG. 35A to FIG. 35C, the nonmagnetic layer 21 is formed to cover the layered structure made up of the magnetic layer 20P, the electrode film 31 and the plating layer 33. The nonmagnetic layer 21 corresponds to the second nonmagnetic layer of the invention.

Next, as shown in FIG. 36A to FIG. 36C, the surface of the nonmagnetic layer 21 is polished by chemical mechanical polishing, for example, so that the magnetic layer 20P is exposed and the top surfaces of the nonmagnetic layer 21 and the magnetic layer 20P are flattened. The magnetic layer 20P thereby becomes the main pole layer 20.

Next, as shown in FIG. 1 and FIG. 2, the protection layer 22 is formed to cover the entire top surface of the layered structure thus obtained. Next, wiring and terminals are formed on the protection layer 22, the substrate is separated into sliders, and processes such as polishing of the medium facing surface ABS and fabrication of rails for flying are performed. The magnetic head is thus completed.

The remainder of configuration, function and effects of the second embodiment are similar to those of the first embodiment.

The present invention is not limited to the foregoing embodiments but may be practiced in still other ways. For example, the magnetic heads of the foregoing embodiments have such a configuration that the read head is formed on the base body and the write head is stacked on the read head. Alternatively, the read head may be stacked on the write head.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a magnetic head for perpendicular magnetic recording, the magnetic head comprising:
   a medium facing surface that faces toward a recording medium;
   a coil for generating a magnetic field corresponding to data to be written on the recording medium;
   a main pole layer having an end located in the medium facing surface, allowing a magnetic flux corresponding to the magnetic field generated by the coil to pass therethrough, and generating a write magnetic field for writing the data on the recording medium through the use of a perpendicular magnetic recording system;
   an auxiliary pole layer having an end located in the medium facing surface, and having a portion located away from the medium facing surface and coupled to the main pole layer; and
   a gap layer made of a nonmagnetic material and provided between the main pole layer and the auxiliary pole layer, wherein:
   in the medium facing surface, the end of the main pole layer is disposed forward of the end of the auxiliary pole layer along a direction of travel of the recording medium with a specific distance therebetween;
   at least a portion of the coil is disposed between the main pole layer and the auxiliary pole layer and insulated from the main pole layer and the auxiliary pole layer;
   the main pole layer includes: a first portion having a specific thickness, one of ends of the first portion closer to the medium facing surface being located at a distance from the medium facing surface; and a second portion having a thickness smaller than the thickness of the first portion and disposed between the first portion and the medium facing surface; and
   the main pole layer has a surface located farther from the gap layer, at least a portion of the surface near the medium facing surface being substantially flat, the method comprising the steps of:
   forming the auxiliary pole layer;
   forming the gap layer and the coil on the auxiliary pole layer; and
   forming the main pole layer on the gap layer, wherein the step of forming the main pole layer includes the steps of
   forming a plating layer by plating in a region that includes a region in which the first portion is to be disposed, such that one of ends of the plating layer closer to the medium facing surface is located at a position that coincides with the position of the one of the ends of the first portion closer to the medium facing surface;
   forming a first nonmagnetic layer to cover the plating layer;
   patterning the first nonmagnetic layer into such a shape that the first nonmagnetic layer is adjacent to the plating layer by polishing the first nonmagnetic layer and the plating layer until the plating layer is exposed;
   forming a space by removing the plating layer by etching, the space being adjacent to the first nonmagnetic layer and having a shape corresponding to the shape of the plating layer;
   forming a magnetic layer in the space and on a top surface of the first nonmagnetic layer, the magnetic layer having a plane geometry corresponding to that of the main pole layer;
   forming a second nonmagnetic layer to cover the magnetic layer; and
   polishing the second nonmagnetic layer and the magnetic layer until the magnetic layer is exposed, so that the magnetic layer becomes the main pole layer.

2. The method according to claim 1, wherein the step of forming the main pole layer further includes a step of removing a portion of an edge formed by a wall of the first nonmagnetic layer facing toward the space and the top surface of the first nonmagnetic layer, the portion of the edge being located near the position of a boundary between the first portion and the second portion, the step of removing the portion of the edge being performed by dry etching and interposed between the step of forming the space and the step of forming the magnetic layer, wherein
   in a region from the boundary between the first and second portions to a specific point closer to the medium facing surface than the boundary, the thickness of the second portion gradually decreases with decreasing distance from the medium facing surface.

3. The method according to claim 1, wherein the magnetic layer is formed by plating.

4. The method according to claim 1, wherein the magnetic layer is formed by sputtering.

5. The method according to claim 1, wherein the end of the main pole layer located in the medium facing surface is made to have a shape of a trapezoid in which a side closer to the gap layer is shorter than the opposite side.

6. The method according to claim 1, wherein a width of the main pole layer, taken in a region closer to the medium facing surface than a specific width-changing point that is located at a distance from the medium facing surface, is equal to a width of the main pole layer taken in the medium facing surface; while a width of the main pole layer, taken in a region farther from the medium facing surface than the width-changing point, is greater than the width of the main pole layer taken in the medium facing surface.

7. The method according to claim 6, wherein a thickness of the main pole layer, taken in a region closer to the medium facing surface than a thickness-changing point that is located between the width-changing point and the medium facing surface, is equal to a thickness of the main pole layer taken in the medium facing surface; while a thickness of the main pole layer, taken in a region further from the medium facing surface to the thickness-changing point, is greater than the thickness of the main pole layer taken in the medium facing surface.

* * * * *